US005628023A

United States Patent [19]
Bryant et al.

[11] Patent Number: 5,628,023
[45] Date of Patent: May 6, 1997

[54] VIRTUAL STORAGE COMPUTER SYSTEM HAVING METHODS AND APPARATUS FOR PROVIDING TOKEN-CONTROLLED ACCESS TO PROTECTED PAGES OF MEMORY VIA A TOKEN-ACCESSIBLE VIEW

[75] Inventors: Barbara J. Bryant, Clinton Corners; Glen E. Garrison, Wallkill; Danny R. Sutherland; Kenneth G. Rubsam, both of Poughkeepsie, all of N.Y.

[73] Assignee: International Business Machines Corporation, Armonk, N.Y.

[21] Appl. No.: 364,200

[22] Filed: Dec. 27, 1994

Related U.S. Application Data

[63] Continuation-in-part of Ser. No. 50,694, Apr. 19, 1993, abandoned.

[51] Int. Cl.[6] .......................... G06F 12/08; G06F 12/10; G06F 12/14; G06F 12/16
[52] U.S. Cl. .......................... 395/800; 395/417; 395/419; 364/DIG. 1; 364/DIG. 2
[58] Field of Search .................... 395/463, 417, 395/700, 800, 726, 467, 419, 403, 375; 364/DIG. 1, DIG. 2

[56] References Cited

U.S. PATENT DOCUMENTS

| 4,392,200 | 7/1983 | Arulpragasam et al. | 395/467 |
|---|---|---|---|
| 4,574,350 | 3/1986 | Starr | 364/726 |
| 4,716,528 | 12/1987 | Crus et al. | 364/650 |
| 4,727,485 | 2/1988 | Keshlear | 364/417 |
| 4,961,134 | 10/1990 | Crus et al. | 364/600 |
| 4,965,719 | 10/1990 | Shoens et al. | 364/650 |
| 5,095,420 | 3/1992 | Eilert et al. | 395/419 |
| 5,134,696 | 7/1992 | Brown et al. | 395/403 |
| 5,237,668 | 8/1993 | Blandy et al. | 395/402 |
| 5,255,384 | 10/1993 | Sachs et al. | 395/417 |
| 5,276,878 | 1/1994 | Sutton et al. | 395/650 |
| 5,280,592 | 1/1994 | Ryba et al. | 395/375 |

OTHER PUBLICATIONS

"Access Protection Mechanism", IBM Technical Disclosure Bulletin, vol. 27, No. 4B, Sep. 1984, pp. 2681–2682.
"Memory Protection Software Facility for OS/2 Shared Data Applications", IBM Technical Disclosure Bulletin, vol. 34, No. 4A, Sep. 1991, pp. 81–89.
"Modified Multiple Locking Facility", IBM Technical Disclosure Bulletin, vol. 34, No. 3, Aug. 1991, pp. 329–332.

*Primary Examiner*—Daniel H. Pan
*Attorney, Agent, or Firm*—Lawrence D. Cutter; Peter L. Michaelson

[57] ABSTRACT

A virtual storage computer system having token controlled storage protection. The computer system includes a processor, a real storage, and a virtual storage containing a user space and a system space. A virtual storage area in the user space provides a protected view of one or more pages of memory located in the real storage. A virtual storage area in the system space provides a token-accessible view of the corresponding pages of memory. To protect the pages of memory, a user program first requests that token controlled protection be provided via the virtual address in the user space and that a corresponding user token be returned by the processor. The user program stores the user token for later use when accessing the protected pages. When the user program requests access to the protected pages, the processor matches the user token with a system token to obtain a token-accessible view in the system space of the protected pages.

25 Claims, 8 Drawing Sheets

VIRTUAL STORAGE COMPUTER SYSTEM HAVING METHODS AND APPARATUS FOR PROVIDING TOKEN-CONTROLLED ACCESS TO PROTECTED PAGES OF MEMORY VIA A TOKEN-ACCESSIBLE VIEW

CROSS-REFERENCE TO RELATED APPLICATION

This application is a continuation-in-part of application Ser. No. 08/050,694 filed Apr. 19, 1993, now abandoned.

BACKGROUND OF THE DISCLOSURE

1. Field of the Invention

The invention relates to apparatus for providing access to memory storage in computer systems, and more particularly, to apparatus and concomitant methods of providing access protection to specific pages of virtual memory space.

2. Description of the Prior Art

Most modern computer systems, particularly mainframe computers, employ high speed random access memory (RAM) circuits as main memory and relatively slow mass memory devices, such as hard disk or magnetic tape drives, as auxiliary (mass) storage. The disparity in access times between random access memory and disk or tape drives is substantial and severe, with the former having access times often ranging in the order of at least tens of milliseconds. Given this disparity, user programs are not executed from auxiliary storage, but rather are transferred therefrom into main memory for execution therein.

In practice, consideration of cost, physical circuitry size and/or power requirements frequently limit the amount of RAM memory that is used in implementing a main memory to a finite real address space which is often substantially less than the maximum address space of a processor that is to access this memory. For example, a processor that operates with a 31 bit virtual address word, which inherently possesses the capability of separately addressing $2^{31}$ (over 2 billion) bytes, may often operate with as little as a few million bytes (Mbytes) of actual RAM. To provide sufficiently rapid execution speeds, the available RAM must be shared among all current user programs that are executing on the processor as well as with a resident portion of the operating system used by the processor. Unfortunately, RAM is rarely, if ever, sized sufficiently large to fully accommodate all the instructions and data that form each such user program and the resident portion of the operating system.

However, it was recognized quite early in the art that, through normal operation of instruction fetches, stack and data accesses, and standard programming techniques, most program instructions possess a rather good spatial locality of reference. This means that, at memory location x in an executing user program, this program will exhibit a strong tendency to interact within relatively small time delays with different but nearby memory locations, such as locations x+1, x+2 and so on. This behavior, often involving preceding instructions, e.g., locations x-1, x-2 and so on, is clearly evident in loops and other similar program structures. Although the organization of external data is often as constrained by the architecture of the processor as are the stack and instruction accesses, such data, particularly arrays, are stored in contiguous memory locations and, as such, often exhibit spatial locality. In this regard, certain programmed operations, such as illustratively clearing, transposing, adding or array multiplication, that at any instance utilize one element of an array will likely access other elements of the array within a short time. Similarly, the art has recognized that instructions and data often exhibit a good temporal locality of reference as well, i.e., where the same memory location is repeatedly accessed over time.

Given these recognitions regarding spatial and temporal localities, the art has turned to and now widely uses a number of memory techniques that attempt to share a relatively small amount of real memory among a number of currently executing user programs, each of which is capable of addressing a much larger memory space. These memory management techniques are generally known as virtual memory techniques.

One such virtual memory technique is paging. Here, in essence, different finite portions, i.e., "pages", of memory data (collectively including both instructions and data values) for each user program, rather than all the memory data for that program, are successively copied ("swapped") from auxiliary storage into main memory and then used for current program execution. Owing to spatial and temporal localities, the main memory contains pages of memory data that not only possess memory locations that have just been recently accessed but also locations that are expected to be subsequently accessed within a very short delay time. With a well designed paging system, the vast majority of memory access time should be spent accessing memory data located within pages previously copied into main memory with relatively little access time being spent in copying new pages of memory data from auxiliary storage.

Specifically, whenever the processor attempts to access memory while executing a user program, the processor issues a so-called "virtual address" for a desired memory datum that is to be accessed. The size of the virtual address is generally only limited by the maximum address space of the processor that is allowed for program usage. By contrast, a so-called "real" or "physical" address is used to directly access memory in order to locate the desired memory datum stored therein. Since the virtual address of any given memory datum is not necessarily the same as its corresponding real address, a translation facility, provided by the operating system working in conjunction with memory access hardware and generally transparent to any executing user program, translates each virtual address issued by the processor to a corresponding real address prior to accessing main memory in order to obtain this datum.

Both virtual and real memory space are divided into fixed sized areas or segments, each of which is, in turn, divided into a number of contiguous pages. Each page is formed of a predefined number of memory locations, typically ranging from 2 to 4 kbytes. Though pages for any program are contiguous in virtual memory; the corresponding physical pages for that program, being swapped into and out of main memory as required by the operating system during on-going program execution, tend to be randomly scattered throughout main memory. A physical page in main memory is often referred to as a "page frame".

The random locations of page frames in main memory necessitates that the operating system maintain address translation, specifically and illustratively segment and page software tables and an address translation process which utilizes these tables for use in translating virtual to real addresses. These tables and the translation process collectively form the address translation facility. For each virtual page copied from auxiliary storage as a page frame into main memory, the address translation tables store the page frame address that corresponds to each virtual page address. Inasmuch as memory locations within any page, whether virtual or real, are contiguous, then through these tables, a virtual address located within such a virtual page can be mapped into a physical address of a location residing in main memory.

Given this virtual addressing scheme, whenever the processor attempts a memory access for a given memory datum during execution of a user program, the processor issues a virtual address for that datum. The datum may currently reside in main memory or it may not. If the datum resides in the main memory, the virtual to real address correspondence for that datum exists in the page and segment tables. As such, the address translation process, upon accessing these tables, extracts the physical address of the datum and thereafter applies this address to the main memory. Once this datum has been accessed, user program execution proceeds accordingly.

If, however, the desired datum does not currently reside within the main memory because a page containing that datum has not yet been swapped into main memory, then no valid entry for its associated virtual page exists in the page and segment tables. As such, the datum must be retrieved from auxiliary storage. Accordingly, the address translation process, upon accessing these tables using that virtual address, produces a page fault. At this point, interpretation of a current instruction (which caused the page fault) halts, the current state of the processor is saved and the processor transfers execution to a software page fault handler. Rather than accessing and copying only the desired datum from auxiliary storage, the page fault handler translates the incoming virtual page address and, then, through input/output controller(s) for an appropriate mass storage device(s), copies an entire page containing that desired datum from auxiliary storage as a page frame into main memory. Thereafter, the fault handler updates the segment and page tables accordingly with a real address for this page. Execution then returns from the fault handler to the address translation process which, in turn, accesses the desired datum from the newly copied page. When appropriate, the fault handler, will subsequently resume execution of the current program instruction that generated the page fault.

The processor must ensure that one user program does not intentionally or accidentally use the pages presently used by another user program or the operating system. The processor performs such memory protection using one or more protection techniques. Typically, main memory is protected by three different protection techniques: storage key protection, low address protection, and page protection. Each protection technique is discussed below.

To facilitate storage key protection, as each page frame is copied into main memory, the processor associates the page frame with a hidden byte known as a storage protection key (hereinafter referred to as a key). The key contains eight bits (one byte); however, only the first four bits are used as the key itself. The remaining four bits of the key are used to indicate page frame status, and are irrelevant to this discussion. As a result of the limited number of bits used for the key, there are only 16 different keys available. Of these 16 keys, key zero is reserved for the operating system. Keys 1 through 15 are assigned to user programs (or individual jobs) as each is executed by the operating system. Since there are only 15 available keys, multiple user programs may be assigned the same key. The key, associated with a particular user program(s) that stores to a given page frame, is itself stored in a register as a hidden byte associated with that page frame.

In practice, the operating system assigns each user program a key. The key is stored in a program status word (PSW) for that particular program. The PSW contains information about each user program presently executing and is stored in a so-called special register within the processor to facilitate repeated access by the operating system during program execution. The specific information carried by the PSW, other than the key, is irrelevant to our page protection technique. Whenever a user program issues a valid virtual address, the translation facility translates the virtual address into a page frame and then the processor compares the key in the PSW of that program to the key associated with that page frame. If the keys are identical, the operating system permits access to that page frame. However, if the keys do not match, the operating system terminates the user program which has attempted an inappropriate memory access. In this manner, a user program cannot inadvertently access (either to read or write) that page frame. Of course, the operating system, having key zero, may access any key protected page frame.

Another memory protection technique protects so-called low address memory space. To maintain a portion of memory that is only alterable by systems programs, the processor uses a low address protection technique. Typically, the first 512 bytes of memory space, known as the low address portion of memory, are reserved for routines which interact with hardware, such as control timer interrupts, supervisor calls, program checks, machine checks, and input/output interrupts. The low address protection technique permits user programs to fetch from the low address portion of memory space. However, user programs are not permitted to store to that memory space.

Another memory protection technique protects individual pages of memory. Using a so-called page protection technique, an entire page of memory can be protected from either inadvertent or intentional memory alteration. Typically, the page protection technique is utilized to protect memory space that is not protected by low address protection. Consequently, page protection enables the processor to protect individual pages of memory within an otherwise unprotected segment of memory. Page protection is used in addition to key protection and provides protection of a memory location from being inadvertently altered by other user programs as well as the operating system. As noted above, key protection does not protect page frames from alterations accomplished by the operating system, i.e., a program using key zero.

Page protection is implemented by setting a page protection bit within a page table entry. The page protection technique blocks a program from storing information to a page that corresponds to a page table entry having a set protection bit. When the protection bit is zero, the processor permits both fetching and storing to a page frame; when the protection bit is one, only fetching from that frame is permitted. In operation, during address translation, the translation routine tests the status of the protection bit for the page frame to which a virtual address points. If a program attempts to store to a location having a set protection bit, e.g., a value of one, the processor interrupts execution of the program.

Typically, during user program execution, the program will request the processor to protect one or more pages of memory. In response, the processor will set the page protection bit for the page frame that the program previously accessed. Consequently, the program requesting the page protection, as well as all other programs having the same key or key zero, may only fetch information from the protected page. Subsequently, the program that requested page protection may wish to write to the protected page. To do so, the processor must first change the page protection bit to zero, then the program alters information within the previously protected page. While the protection bit is set to zero, the entire page is open to inadvertent alteration by other programs which have the same key as the program that requested page protection. In addition, the operating system, having key zero, may inadvertently write to the presently unprotected page. Inadvertent storage, known as overlay, typically occurs when a power failure or programming error causes a program to write to an incorrect address.

Thus, a need exists in the art to provide a memory space protection technique which allows a program that has requested page protection to both read and write information to its protected page without opening the page to inadvertent overlay. Such a memory protection technique must be compatible with present virtual memory storage systems and their present protection techniques, i.e., storage key protection, low address protection and page protection.

SUMMARY OF THE INVENTION

Accordingly, an object of our invention is to provide a virtual memory storage protection technique that permits a program to protect an area of memory and to subsequently store information to the protected area.

Another object of our invention is to provide such a technique that maintains overlay protection against user programs storing to the protected page while a user program that requested page protection for a particular page is storing information to that protected page.

Yet another object of our invention is to provide such a protection technique which is compatible with presently available protection techniques used by virtual memory systems.

These and other objects are achieved in accordance with our present invention by providing a virtual storage computer system having token controlled storage protection. The computer system includes a data processor for executing a user program, a real storage providing a real storage area with a real address and a virtual storage providing a first virtual storage area with a first virtual address. The user program has a protection request instruction for requesting that token controlled storage protection be provided for the real storage area via said first virtual address and that a corresponding user token be returned for use by the user program when requesting access to the real storage area. The system includes an address translation apparatus, responsive to an access request, which translates a virtual address into a corresponding real address. A token protect apparatus, responsive to the protection request instruction, generates the user token and a corresponding system token. An area protection apparatus establishes a protected view and a token-accessible view of the real storage area via the address translation means.

According to one aspect of our token controlled page protection technique, the computer system assigns a token to a user program when the program requests a page of protected storage space. The token is stored in a register such that the program can access the token when the program needs to alter the contents of the protected page. As the token is assigned, the operating system builds a protection verification segment table (PVST) and a protection verification page table (PVPT). The PVST contains entries which point to particular page origins that are used as addresses to PVPT entries. The PVPT contains tokens as entries corresponding to each protected page.

In operation, the user program issues a special instruction that retrieves the previously stored token from its register. The user program then presents a virtual address of the datum in the protected page which the instruction intends to alter and the token to an address translation and protection verification process. This process translates the virtual address into a real address in a manner that is common in the art. If the page in which the real address is located is not protected, the real address is used to access the datum at that address and alter it in the manner requested by the special instruction. On the other hand, if the real address is contained in a protected page, the process uses the PVST and PVPT to determine a token associated with the protected page. If this token matches the token provided by the special instruction, the instruction can alter the contents of the datum at the real address. However, if the tokens do not match, the operating system terminates the program for attempting an unauthorized memory access. In this manner, our token controlled page protection technique protects pages of memory from alteration by all programs not possessing an appropriate token.

According to another aspect of our invention, the computer system creates a second virtual storage area with a second virtual address in response to a token protection request. The second virtual storage area corresponds to the first virtual storage area, i.e. the real storage area. The system establishes the protected view of the real storage area with respect to the first virtual address, and establishes the token-accessible view of the real storage area with respect to the second virtual address. A token table holds the system token, the first virtual address and the second virtual address in a table entry. When accessing the real storage, the user program uses the user token to request a pointer to locate a corresponding system token in the token table and to retrieve a pointer virtual address corresponding to a user virtual address provided with user token. A token verification control generates the pointer virtual address and passes it to the user program if the user virtual address is calculated to be in the first virtual storage area. A program exception is requested if the user virtual address is not in the first virtual storage area. An isolating storage area is created contiguous with the second virtual storage area. A protected view of real storage area is established with respect to the virtual address of the isolating storage area.

BRIEF DESCRIPTION OF THE DRAWINGS

The teachings of the present invention can be readily understood by considering the following detailed description in conjunction with the accompanying drawing, in which.

To facilitate understanding, identical reference numerals have been used, where possible, to designate identical elements that are common to the figures.

DETAILED DESCRIPTION

After reading the following description, those skilled in the art will clearly realize that our invention could be used in conjunction with nearly any virtual memory computer to improve its page protection technique. Nevertheless, where appropriate and for purposes of specific illustration, our invention will be discussed below in the context of use in an IBM model 390/Enterprise Systems Architecture (ESA) general purpose mainframe computer manufactured by the International Business Machines Corporation of Armonk, New York (IBM is a registered trademark of the International Business Machines Corporation).

Now, to fully appreciate the teachings of our present invention, we will discuss the rudiments of paged memory systems and their respective page protection techniques that can be used in any general purpose mainframe computer. Additionally, we will include a detailed discussion of our invention, particularly as it could be used in conjunction with an illustrative computer, such as an IBM model 390/ ESA mainframe computer.

Figure 1:
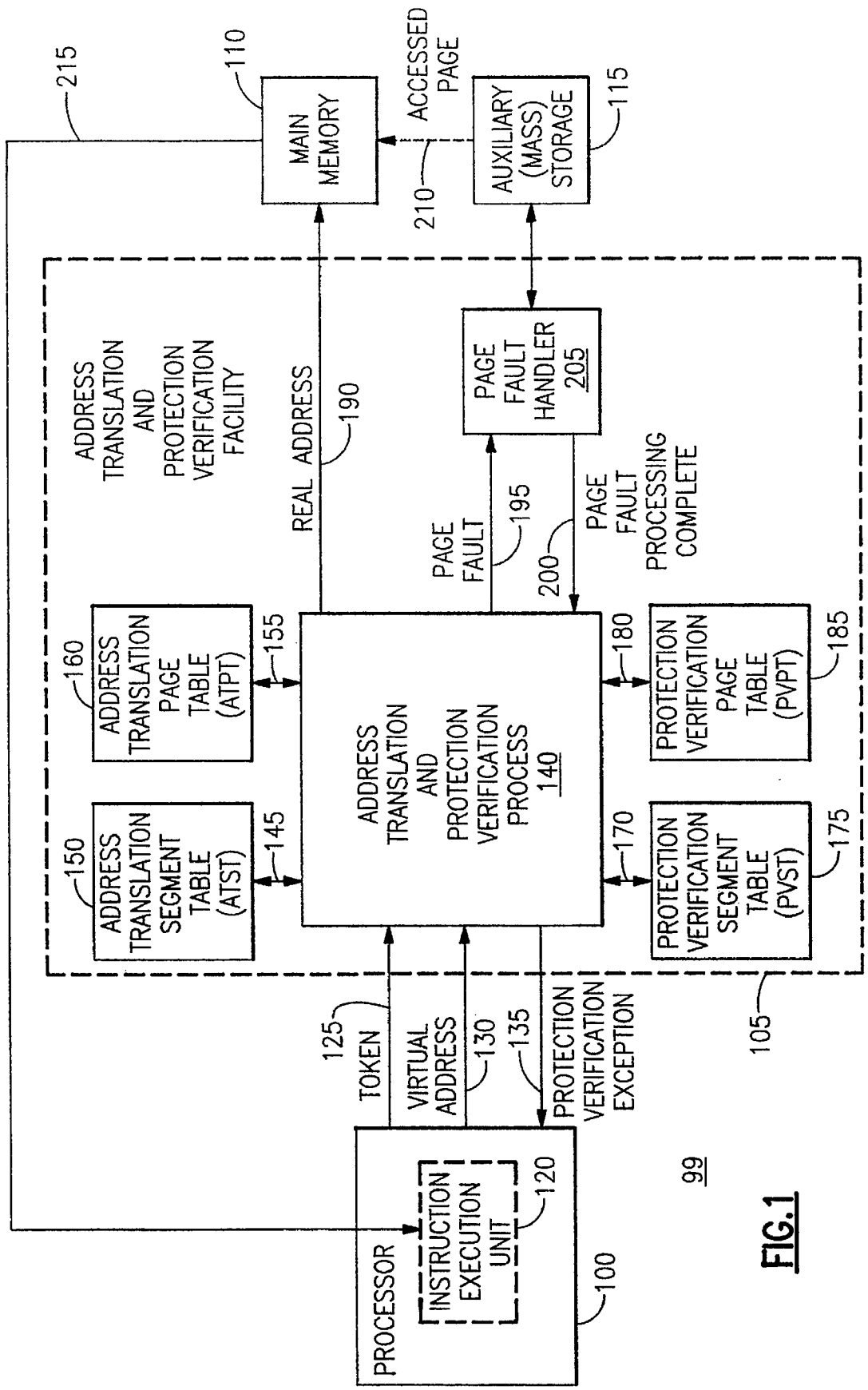
FIG. 1 depicts a high level block diagram of various components for translating virtual to real addresses in virtual memory computer system 99 in a general purpose computer and for implementing, in accordance with one embodiment of our invention, a token controlled page protection technique.

Specifically, FIG. 1 depicts a high level diagram of various components for performing memory access operations using a token controlled page protection technique, and specifically including those components which translate virtual to real addresses and are typically used in a general purpose mainframe computer. Additionally, the diagram includes components for determining whether a program requesting to store information into an otherwise page protected page frame can do so without causing a protection violation exception. As shown, these components include processor 100 which contains address translation and protection verification facility 105, (shown separate from the processor for clarity of illustration), main memory 110 and auxiliary (mass) storage 115. Additionally, processor 100 executes an operating system (not shown but well-known in the art). Processor 100, main memory 110 and auxiliary storage 115 are all implemented in specialized hardware. Main memory 110 is typically implemented using high speed random access memory (RAM) circuits, while auxiliary storage 115 is typically formed of magnetic tape, hard disk drives and specially allocated portions of main memory known as "expanded storage". The disparity in access times between main memory 110 and auxiliary storage 115 is substantial and severe, with the former having access times ranging on the order of tenths of microseconds or less while the latter has access times often ranging on the order of at least tens of milliseconds.

User programs, also known as application programs, are executed by processor 100 and specifically by instruction execution unit 120 contained therein. During the execution of a user program using a paged memory system, processor 100 issues a virtual memory address of a memory location in order to obtain a memory datum (collectively including both instructions and data values) stored thereat. In executing certain instructions or when the address translation facility is disabled, processor 100 may operate in a real addressing mode, thereby generating a real memory address—for which address translation is not required. Hence, for purposes of illustration and for simplifying the following discussion, this discussion will hereinafter assume that processor 100 is operating in a virtual addressing mode.

The virtual address space available for a user program is only limited by the maximum address space for the processor. However, the virtual address does not necessarily equal the real address in main memory 110 at which this datum is actually stored. The real address space is limited, not by processor 100, but rather by the capacity of main memory 110. Accordingly, address translation and protection verification facility 105 is used to translate the virtual address provided, by processor 100, over path 130, into a real or "page frame" address that is applied, via path 190 to main memory 110. If the page frame is not page protected, the real address is then used to access main memory 110. The resulting memory datum generated by main memory 110 is then routed, via path 215, back to processor 100 for subsequent use by instruction execution unit 120 during program execution.

Alternatively, if the page frame is page protected, processor 100 must present, along path 125, a protection token (hereinafter referred to as a "token") to translation and protection verification facility 105. This token is compared to a token associated with the protected page frame, and if the tokens match, the data in the page frame can be altered by the program possessing a correct token even though that page is page protected. In this manner, certain programs can be authorized to alter protected pages without removing the protection for the entire page. If a correct token is not presented by processor 100, the address translation and protection verification facility issues, along path 135, a protection verification exception. In response thereto, the operating system will terminate the program which requested the unauthorized access. The details of how the tokens are assigned and used are discussed below.

Address translation and protection verification facility 105 is often implemented using a combination of well known specialized hardware, microcode and software. This software generally forms part of the operating system (not shown but well known) that is executed by instruction execution unit 120 to control the operation of the computer. The usage of the address translation and protection verification facility, particularly if the facility is well designed, is typically transparent to the execution of user programs by processor 100 and generally, but not always as will be discussed below, imparts relatively little processing delay to the execution time of these programs.

Address translation and protection verification facility 105 contains address translation and protection verification process 140 which is typically implemented in microcode; fault handler 205 which is usually implemented in software as part of the operating system; and address translation segment and page tables 150 and 160, and protection verification segment and page tables 175 and 185—all of these tables typically being within main memory 110. Inasmuch as tables 150, 160, 175 and 185 are an integral part of address translation and protection verification facility and are accessed by address translation and verification process 140, then, for ease of understanding, these tables have been shown within facility 105.

In operation, address translation segment table (ATST) 150 and address translation page table (ATPT) 160 contain a memory mapping which converts a virtual page address into a page frame address for each user currently executing a program on processor 100. The operating system first determines whether segment and page tables exist for the user program sending a virtual address to the processor. If these tables do not exist, the operating system then builds these tables within main memory 110 and stores these tables within allocated page frames in main memory. Each such user is assigned one ATST. A register (not shown but well known) located within processor 100 is also assigned to that user and contains the starting real address (also referred to as ATST origin or simply "ATSTO") of the associated ATST assigned to this user. The ATST, as will be explained in detail below, contains entries that point to the origins of address translation page tables (ATPT). A user has at least one and sometimes multiple ATPTs. Each ATPT contains a corresponding page frame address for each virtual page address stored within the table. Each entry within the ATST and ATPT(s) for a given user contains a bit, i.e., an "invalid bit" which indicates whether that entry is "valid" i e meaningful (currently usable), or not If an entry is not currently valid, then, in the absence of being initialized, that entry has no valid meaning and is not used by the operating system. Alternatively, if an entry is valid, then the operating system is subsequently able to use this entry during address translation. Since the address of any memory datum located within both a virtual page and its corresponding page frame, relative to the origin of the associated page, is the same for both the virtual and real pages, only the virtual page address bits in a virtual address need to be translated into page frame address bits. The low order address bits that provide addressing within a page, i.e., byte index bits, are merely copied from the virtual to the real addresses, as described in detail later.

After a user instructs the operating system to begin executing a user program, the operating system initiates a conventional key protection technique. To facilitate key protection of main memory 110, the operating system assigns that user program a key. The key contains eight bits; however, only the first four bits form the key itself. Therefore, there are typically only 16 different keys available, e.g. $2^4$. Of these 16 keys, key zero is reserved for the operating system. Keys 1 through 15 are assigned to user programs (or individual jobs) as each is executed by processor 100. In this manner, the key associated with a user program that stores a page frame is also assigned as the key for that page frame. The remaining four bits of the key are used to indicate page frame status; a use that is irrelevant to our invention.

In practice, the operating system assigns each user program a key. The key is stored in a program status word (PSW) for that particular program. The key is also stored in a memory location in main memory. This memory location is associated with the page being protected by the key protection technique. The PSW contains information about each user program presently executing in processor 100 and the PSW is stored in a so-called special register within the processor to facilitate repeated access by the operating system during program execution. The specific information carried by the PSW, other than the key, is irrelevant to our inventive page protection technique. In operation, whenever a user program issues a valid virtual address, the translation facility first translates the virtual address into a page frame. Thereafter, the operating system compares the key in the PSW of that program to the key associated with that page frame, i.e., the key in a memory location associated with that page frame. If the keys are identical, the operating system permits access. However, if the keys do not match, the operating system terminates the user program which has attempted an inappropriate memory access. In this manner, one user program cannot inadvertently access a page frame having a key assigned to another user program. However, the limited number of available keys forces the operating system to assign the same key to different user programs. Of course, the operating system (key zero) may access any key protected memory space.

After the key is assigned and ATST and ATPT have been built, the user program can request that certain page frames be page protected. For those protected pages, the operating system sets a bit in the ATPT entry that indicates that the page corresponding to that entry is protected. Traditionally, a user could not alter the information in those protected pages unless the user program requested that the operating system first remove the page protection.

Our invention, however, permits the user program that protected the pages to alter the information stored therein without removing the page protection. To facilitate our inventive form of page protection, the operating system, upon the user program requesting page protection, builds protection verification segment table (PVST) 175 and protection verification page table (PVPT) 185. The operating system builds these tables within main memory 110 and stores these tables within page frames allocated to the address translation and protection verification facility. Of course, if the user program does not request any protected pages, the PVST and PVPT are not built.

Once the PVST and PVPT have been built, the operating system assigns each protected page a token. Each token contains 16 bits, thus, providing 65,536 unique tokens. Each user program request for page protection is typically assigned a unique token, i.e., one of the 65,536 available tokens. Therefore, a single user program which requests page protection at different times during program execution generally is assigned a different token for each such request. In this manner, groups of pages may be assigned one particular token and another group of pages may be assigned a different token, though all the protected pages are accessed by a single user program. Typically, each group of pages contains contiguous pages in real memory space. As other user programs request page protection, each request is assigned a different token. The assigned tokens are stored in special registers that are accessible to the token's associated user program. Additionally, the operating system stores each token as an entry in the PVPT.

The operating system assigns one PVST to each user program. A register (not shown but well known) located within processor 100 is also assigned to that program and contains information pointing to a memory space which stores the starting real address (also referred to as a PVST pointer) of the associated PVST assigned to this user. The PVST, as will be explained and shown in detail below, contains entries that point to the origins of PVPTs. A user program that has requested page protection has at least one and sometimes multiple PVPTs. Each PVPT contains a corresponding token for each virtual page address that is page protected. Each entry within the PVST contains a bit, i.e., an "invalid bit" which indicates whether that entry is "valid" i e meaningful, or not If an entry is not currently valid, then, in the absence of being initialized, that entry has no valid meaning and is not used by the operating system. Alternatively, if an entry is valid, then the operating system is subsequently able to use this entry during protection verification.

To utilize the protection verification process and be able to alter information in an otherwise protected page, the user program must use special instructions that evoke the protection verification process. If these special instructions are not used and storage to a protected page is requested using traditional instructions, the operating system will deny that storage function. However, by using the special instructions, a user program can retrieve its assigned token and use that token to alter the contents of a protected page having a matching token. Since our inventive page protection technique is only evoked when these special instructions are used, the following discussion will be limited to the use of these instructions. The specific details of the special instructions are discussed below.

Specifically, the special instructions accomplish two tasks: (1) perform a particular function such as storing to a page protected memory address and (2) retrieve a token from a register such that the function can be performed. For example, a traditional "store" instruction has the following format:

TABLE 1

| OP CODE | $R_1$ | $X_2$ | $B_2$ | $D_2$ |
|---|---|---|---|---| bits: 0  8  12  15  20  31 where: OP CODE is an operation code, typically a hexidecimal number, that defines the function to be performed,
$R_1$ is a particular register; and
$X_2$, $B_2$ and $D_2$ are registers whose combined contents define a virtual address.

Functionally, a traditional "store" instruction accesses register $R_1$ and stores the contents therein in main memory at the virtual address defined by $X_2$, $B_2$, $D_2$. Of course, the virtual address must be translated to a real address to facilitate storage. If that real address is within a protected page, this instruction would not be completed.

To utilize our token controlled page protection technique, the user program uses special instructions having unique op codes. The following example of a special instruction used to evoke the token controlled page protection technique is meant to be illustrative. Those skilled in the art will realize that any instruction used to alter the contents of a page of memory can be modified to facilitate utilization of our invention.

An illustrative implementation of these special instructions use what is known as a "double register pair". For example, one such special instruction, known as a "store with token" instruction, has the same format as the traditional "store" instruction shown in Table 1. However, the particular op code would cause a "store with token" function to be performed rather than a traditional "store" operation. This function defines $B_2$ as a double register pair, e.g., registers $B_2$ and $B_{2+1}$. As such, when the instruction is executed the contents of register $B_2$ and its associated register $B_{2+1}$ are retrieved. The content of register $B_{2+1}$ is a token. Thus, the instruction can present to address translation and protection verification process 140 a token, i.e. the contents of register $B_{2+1}$, and a virtual address defined by the contents of registers $X_2$,$B_2$ and $D_2$. Process 140, then, translates the virtual address to a real address which is page protected, determines a token associated with the protected page from the PVPT, and compares the token associated with the protected page with the token supplied by processor 100. If the tokens match, the content of register $R_1$ is stored in main memory at a real address corresponding to the virtual address. If the tokens do not match, the operating system deems the user program has attempted an unauthorized memory access and terminates the user program which executed the "store with token" instruction.

Now, continuing with the discussion of FIG. 1, once the operating system builds the various segment and page tables or confirms their existence for the user program, the operating system begins actual program execution. Inherent in this execution is address translation. Although typically transparent to the user program, each virtual address issued by instruction execution unit 120 is first translated, by facility 105, during program execution into a page frame address for subsequent use in accessing main memory 110. In particular, after a virtual address is issued by the processor, that address is routed, as symbolized by path 130, to address translation and protection verification process 140 located within facility 105. Process 140 accesses the ATST and ATPT for the current user to locate the specific page table entry for the incoming virtual page address. If the invalid bit in an entry accessed from the ATST is set to zero, then this entry is currently valid for this user. Then, using, inter alia, a page table origin stored within this segment table entry, process 140 accesses a specific entry in an associated ATPT and reads the corresponding page frame address from this entry. If the invalid bit contained within this ATPT is set to zero and the user has a key which matches the key for this page table entry, then this page is valid and accessible for this user. This indicates that the virtual page that is being addressed has a corresponding page frame residing within main memory 110. As such, the page frame address is simply read from this page table entry.

Whether this user program can store to this page is determined by the page protection bit within the ATPT entry. If the protection bit is zero, the user program may either fetch or store to the page. Alternatively, if the protection bit is set to one, the user program may only read from the page. However, if the instruction execution unit has provided the correct token, i.e., matching the token in the PVPT corresponding to this address, then the user may fetch or store to this address within the otherwise protected page. The process of accessing the PVPT to determine a token is discussed below in detail.

While virtual pages are contiguous in virtual address space for any user program, corresponding page frames for that program, being swapped into and out of main memory as required by the operating system during ongoing program execution, tend to be randomly scattered throughout main memory. Accordingly, each entry in the ATPT contains information for generating the complete page frame address for that page, e.g., the complete address is formed by appending three zeros to the ATPT entry. Hence, with a valid page table entry, process 140 obtains the corresponding page frame address from the ATPT entry. The low order virtual address bits are then appended to this corresponding page frame address to yield a real address that is applied, via path 190, to main memory 110.

Now, in the event that the accessed entry in either the ATST or ATPT for the user contains an invalid bit that is set and hence indicates an "invalid" state for that entry, then address translation protection verification process 140 issues an appropriate interrupt (well known and not shown) to signify a respective segment or page table fault. On the one hand, for an invalid ATST table entry, this means that an associated ATPT, which would be expected to contain an entry for the current virtual page address being translated, simply does not exist in main memory 110. Since the ATPT does not exist, then clearly an expected entry on that table for the particular virtual page being translated does not exist as well. In this case, the operating system would now build the ATPT. Once the ATPT is created, the invalid bits in all of its entries would be reset to reflect an invalid condition. On the other hand, an invalid page table entry indicates that a corresponding page frame for the particular virtual page address being translated simply does not yet exist within main memory 110. Therefore, in either situation, as a result of just building the ATPT based upon an invalid segment table entry or attempting to access an invalid page table entry, the operating system realizes that the requested page does not reside within main memory 110 and issues a "page fault". In response to this fault, fault handler 205 obtains the missing page from auxiliary storage 115. Specifically, upon issuance of a page fault by process 140, this process instructs the operating system to halt execution of the current instruction by instruction execution unit 120. The current state of processor 100 is then saved by the operating system. Processor 100 then transfers execution, as symbolized by path 195, to page fault handler 205. The page fault handler triggers certain system software functions to identify whether there is a copy of the faulted page in the auxiliary storage. If a copy of the faulted page is not currently resident in the auxiliary storage, a new page frame (normally cleared as zeros) is allocated within main memory 110. Proper input/output operations are initiated through input/output controller(s) (well known and not shown) associated with auxiliary storage 115, and a desired page from the auxiliary storage is copied (swapped), as symbolized by dashed line 210, into a newly allocated page frame within main memory 110. One or more well known algorithms, which are not relevant here, are executed by the operating system to identify that specific page frame which is to be allocated. Inasmuch as the processor will likely be executing one or more other user programs while a page is being swapped into main memory 110, execution of the specific user program that generated the page fault will often not resume immediately upon completion of the swap. In this case, upon completion of the swap, various well known components (well known and not relevant here) of the operating system will update the ATPTs for this new page frame, "ready" the specific user program and then place that program in a dispatchable state from which the program will eventually be dispatched to the processor and then resume execution. After the tables have been appropriately updated, then the fault handling process concludes with execution returning to process 140, as symbolized by path 200.

Though the process discussed above, of swapping pages from auxiliary storage 115 into main memory 110 in response to a page fault does not form part of the invention, it has been described at least on a simplified basis, to provide a full understanding of the overall address translation and protection verification process. However, for simplification, the following discussion of the token controlled address translation process will assume, unless specifically noted otherwise, that all virtual pages for which translation is being requested, have already been swapped into main memory 110 and have corresponding entries in ATST 150, ATPT 160, PVST 175 and PVPT 185.

Figure 2:
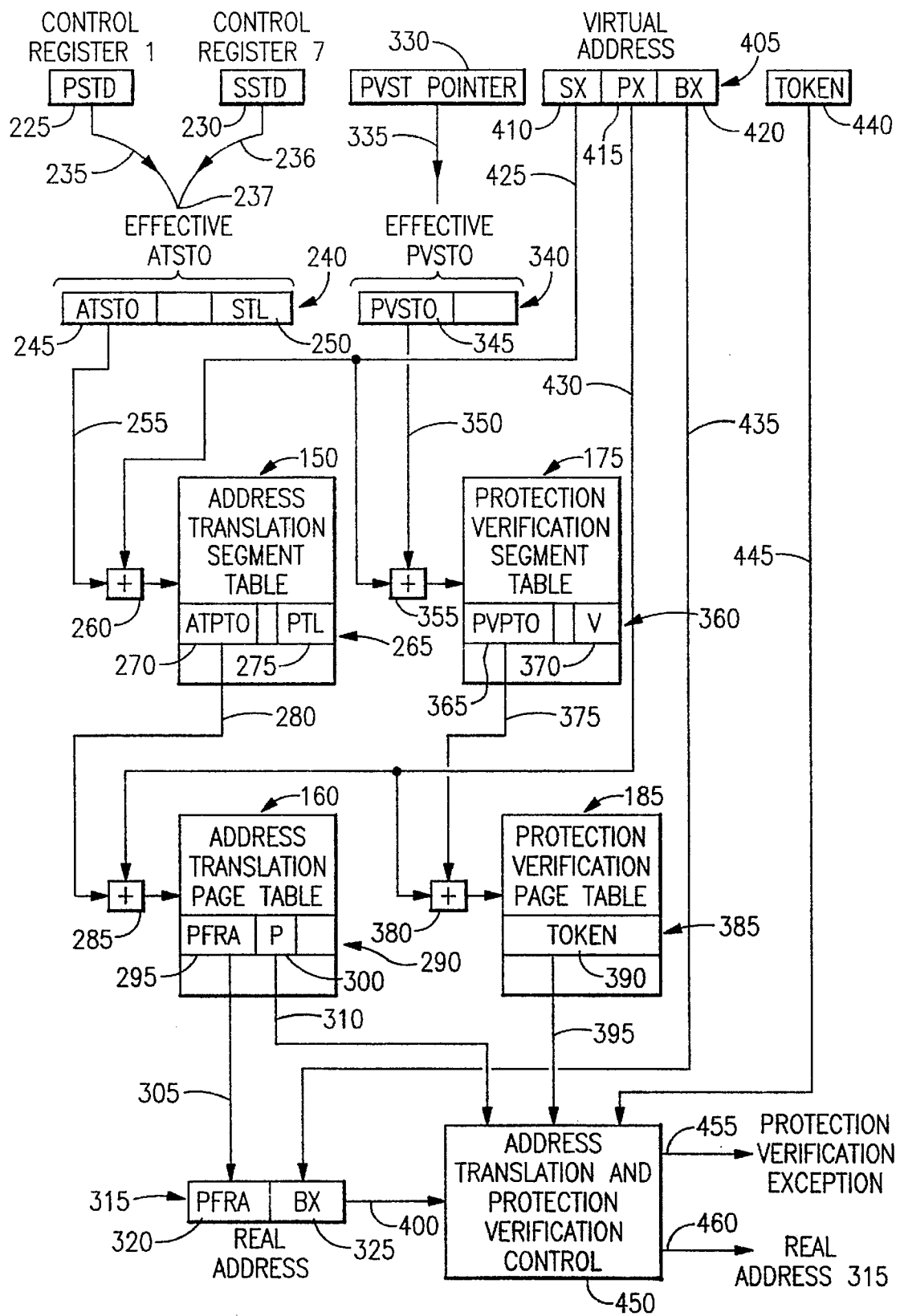
FIG. 2 depicts a detailed block diagram of process 220 for providing address translation and page protection verification for computer system 99 of FIG. 1.

Now, with the above overall description in mind, FIG. 2 depicts a simplified diagram of a virtual to real address translation process 220 using our inventive token controlled page protection technique. Process 220 could occur during ongoing program execution in illustratively an IBM model 390/ESA mainframe computer.

In the computer, a user program can employ either a primary or secondary virtual address space. To the extent relevant here, primary virtual addresses utilize a primary segment table; while secondary addresses utilize a secondary segment table. Therefore, as contrasted with the description given above, a user program of this particular computer may have two ATSTs: a primary ATST and a secondary ATST. The processor in this computer assigns two registers, control register 1 labeled as register 225 and control register 7 labeled as register 230, to a user program during current program execution. Registers 225 and 230 respectively hold segment table designations (STDs) for translation of primary and secondary virtual addresses. The processor uses the STDs to form a pointer, as described below, into either the primary or secondary ATST. Once the appropriate control register is selected, for reasons and in a manner both of which are not relevant here, address translation proceeds in the same fashion for either ATST. Inasmuch as both of these registers store 32 bits and have the same data format; the following discussion will primarily refer to register 225 and the primary segment table designation (PSTD) stored therein. Within this register as given in Table 2 below, the highest order bit (bit 0) is a control bit, not relevant here. The next nineteen bits (bits 1–19) store the primary segment table origin—PSTO (secondary segment table origin, SSTO, in register 230). The PSTO, with twelve zeros, appended to the right, forms a real (or sometimes absolute) address that designates the beginning (origin) of this segment table. The next five bits (bits 20–24) are not used. The remaining seven bits (bits 25–31) store a number that specifies the primary segment table length—PSTL in units of 64 bytes, thus making the length of the ATST variable in multiples of sixteen entries. The length of the primary ATST, in units of 64 bytes, is one more unit (64 bytes) longer than the value stored in the PSTL field in register 225. The PSTL or SSTL value is used by the address translation process to establish whether the entry designated by a segment index (SX) portion, as described below, of a primary or secondary virtual address respectfully falls within the primary or secondary ATST.

TABLE 2

Primary Segment Table Designation – Register 225

| | X | PSTO | | PSTL |
|---|---|---|---|---|
| bits: | 0 | 1 | 20 | 25 | 31 | where: "X" denotes a control bit.

As noted above, the address translation process utilizes segments and pages. Generally, unauthorized access to the pages is limited by the use of protection keys, as described above. For the following discussion, it is assumed that the program producing the virtual address to be translated is authorized to access the resultant page frame, i.e., the key in the PSW matches the key associated with the accessed page frame.

Within main memory, each segment is a block of contiguous virtual addresses that spans 1 Mbyte and begins at a 1 Mbyte boundary. A virtual page is a block of sequential virtual addresses that spans 4 kbytes and begins at a 4 kbyte boundary. An incoming virtual address, specifically address 405, is divided into three fields: bits 1–11 form segment index (SX) field 410, bits 12–19 form page index (PX) field 415, and bits 20–31 form byte index (BX) field 420. Bit 0 in the virtual address is not used. ATST and ATPT are initially used to translate virtual to real addresses. As such, the contents of these tables reflect a current assignment of real storage within the main memory of the computer. As noted above, real storage is assigned in units of a full page frame with all the locations being assigned contiguously within a page frame. These page frames, as discussed above, are generally not contiguous in main memory, although corresponding virtual pages are contiguous in virtual address space.

With this in mind, address translation and protection verification process 220 begins with application of virtual address 405 and token 440 thereto. First, an effective segment table designation is first generated. Based upon whether the user is employing primary or secondary virtual addressing, the contents of register 225 or 230 are used in translation as symbolized by lines 235 and 236, to form an effective segment table designation, specifically designation 240. The ATST origin (ATSTO) residing in designation 245 points to the beginning of an appropriate ATST, e.g., ATST 150, for the user program. From virtual address 405, the bits in segment index (SX) field 410 are appropriately routed, as symbolized by line 425, along with the ATST origin field, as symbolized by line 255, to ADD process 260 which appropriately combines these fields to generate a real (or absolute) address into ATST 150. Specifically, the thirty-one bit address of the desired segment table entry is obtained, in real (or absolute) storage, by appending twelve bits having zero value to the right of bits 1–19 of the effective segment table designation and adding the value of segment index 410 from the incoming virtual address with two rightmost and eighteen leftmost zeros appended thereto, i.e., the value of the segment index is multiplied by four. All thirty-one bits of the resulting address produced by ADD process 260 are used to address ATST 150. As part of the segment table lookup process, bits 1–7 of virtual address 405 (the six most significant bits in the ATST) are compared against the value of the segment table length that resides in effective segment table designation 250 to establish whether, as noted above, the addressed segment table entry lies within the ATST, here ATST 150. If the value in the segment table length field is less than the value in the corresponding bit positions of virtual address 405, a segment translation exception is recognized.

Each entry in ATST 150, though simplified somewhat in FIG. 2, has the specific format shown in Table 3 below:

TABLE 3

Address Translation Segment Table Entry

| 0 | ATPT Origin | I | C | ATPTL |
|---|---|---|---|---| bits: 0  1           26 27 28      31 where:  I is an invalid bit; and
C is a common segment bit.

As shown above, the first bit in a ATST entry is set to a zero value. The next twenty-five bits (bits 1–25), with six zeros appended to the right, form the ATPT origin (ATPTO) for a specific ATPT. The ATPTO can be real or absolute. The invalid bit (I), bit 26, is set to a zero state to signify that the segment table entry is valid, i.e., meaningful, and available for use during subsequent address translation. If this bit is reset to one, this signifies that the associated segment table entry is not meaningful and cannot be used during address translation. As such, if this entry is accessed therefor, a segment translation exception will then be recognized. The common segment bit, bit 27, identifies the manner through which the segment table entry can be used. Specifically, if the value of the common segment bit is zero, then the associated segment is a so-called "private segment". In this case, this segment table entry and the ATPT it designates may only be used in association with the ATST origin that designates this particular ATST, i.e., ATST 150. Alternatively, if the value of the common segment bit is one, then the segment is a so-called "common segment". In this case, the segment table entry and the page it designates may continue to be used for translating addresses corresponding to the segment index even though an ATST other than table 150 has been specified by the ATST origin in effective segment table designation 240.

If no exceptions are recognized during ATST lookup, then the resulting entry is fetched from ATST 150, here shown as entry 265. This entry specifies, through the ATPT origin (ATPTO) field, the real (or absolute) address of the beginning of a specific ATPT and, through the ATPT length (ATPTL) field, the length of this page table.

Once segment table entry 265 is obtained, this entry along with the page index in virtual address 405 are used to access ATPT 160 to obtain the page frame address corresponding to the virtual page address. In particular, segment table entry 270 obtained from ATST 150 is routed, as symbolized by line 280, to one input of ADD process 285. The page index (PX) is routed, as symbolized by line 430, to another input of ADD process 285. This process generates a thirty-one bit real (or absolute) address for ATPT 160 by first appending six zeros to the right of ATPT origin 270 and appending two rightmost and twenty-one leftmost zeros to page index 415, i.e., the value of the page index is multiplied by four, and then adding the resultants together. All thirty-one bits of the address to the page table are used. As part of the page table lookup process, the four leftmost bits of page index field 415 are compared against the bits in the ATPT length field 275 to establish whether the addressed page table entry lies within ATPT 160. If the value in ATPT length field 275 is less than the value in the four leftmost bits in page index field 415, then a page translation exception is recognized.

Each entry in ATPT 160, though simplified somewhat in FIG. 2, has the specific format shown in Table 4 below:

TABLE 4

Address Translation Page Table Entry

| 0 | PFRA | 0 | I | P | 0 | irrelevant |
|---|---|---|---|---|---|---| bits: 0  1       20                    31 where:  PRFA is a page frame real address, referred
to herein as simply a page frame
address;
I is an invalid bit; and
P is a page protection bit.

As shown above, the first bit in a page table entry is set to a zero value. The next nineteen bits (bits 1–19) provide the leftmost twenty bits of the page frame address 295. When these bits are concatenated to the left of the twelve bit address in byte index field 420, a thirty-one bit real address results. The invalid bit (I), bit 21, specifies whether that page table entry is valid, i.e., meaningful, and available for use during translation of the current virtual address. When this bit is zero valued, this page table entry is meaningful and can be used during translation; otherwise, if this bit is a one, this page table entry is not meaningful and cannot be used during translation. The page protection bit (P) 300, bit 22, specifies whether stores (write operations) can be made into the corresponding page frame in main memory but does not affect fetch accesses from this page. If this bit is zero valued, then address translation and protection verification controller 450 detects this condition via line 310 and permits data storage into this page; otherwise, if this bit is one, stores are disallowed unless the user program requesting the translation provides a token to override the page protection. The use of tokens is described below. Bit positions 0, 20, and 23 of each page table entry must contain zeros; else, a translation exception is recognized as part of the execution of an instruction that uses this page table entry for translation. Bit positions 24–31 of a page table entry are irrelevant to the present invention.

If no exceptions are recognized during ATPT lookup, then the entry fetched from the ATPT, here shown as entry 290, provides page frame address 295 for virtual address 405. When concatenated with byte index 420 the combination forms real address 315. Line 435 routes byte index 325 from virtual address 405. Line 305 routes page frame address 320 from page table entry 290.

If the page frame is not page protected, address translation and protection verification controller 450 permits real address 315 to be used, via lines 400 and 460, to access a byte location within the main memory for either fetch or store operations. However, if the page frame is protected, then the real address can only be used to access the page frame for fetch operations. Using our inventive token controlled page protection technique, a store operation, or any operations that alter the contents of a page frame, can be performed if the user program accessing the protected page holds an authorized token provided by using a special instruction as discussed above.

Typically, as discussed above, the operating system produces a token whenever a program requests protection of a page frame. The program stores the token in a register for future use, i.e., for retrieval when using one of the special instructions. Moreover, other programs can be authorized to store to the protected page if they are provided with the location of the register storing the token.

Once the virtual to real address translation is complete, the following process determines if the token provided by the program matches a token associated with a protected page frame. If the tokens match, the processor permits alteration of the page frame; otherwise, execution of the user program is halted.

Register 330 contains information that serves as the protection verification segment table pointer (PVST pointer) for facilitating determination of a token associated with the presently translated page address. The PVST pointer serves as a designator of memory space 340 containing the protection verification segment table origin (PVSTO). PVSTO 345 marks the beginning of an appropriate protection verification segment table (PVST), e.g., PVST 175, for the user. From virtual address 405, the bits in segment index (SX) field 410 are appropriately routed, as symbolized by line 425, along with the PVSTO, as symbolized by line 350, to ADD process 355 which appropriately combines these fields to generate a real address into PVST 175. Specifically, the thirty-one bit address of the desired PVST entry is obtained, in real storage, by appending twelve zeros to the right of bits 1–19 of the effective PVST designation and adding the value of segment index 410 from the incoming virtual address with two rightmost and eighteen leftmost zeros appended thereto. All thirty-one bits of the resulting address produced by ADD process 355 to PVST 175 are used.

Each entry in PVST 175, though simplified somewhat in FIG. 2, has the specific format shown in Table 5 below:

TABLE 5

Protection Verification Segment Table Entry

| PVPT Origin | unused | I |
|---|---|---| bits: 0         23   30 31 where: I is an invalid bit

As shown above, the first twenty-three bits (bits 0–22) contain PVPTO 365, a real address of an origin of a protection verification page table (PVPT). The last bit (bit 31), a validity bit (V) 370, is set to a zero state to signify that the PVST is valid, i.e. meaningful, and available for use during subsequent protection verification. If this bit is reset to one, this signifies that the associated PVST entry is not meaningful and cannot be used during protection verification. As such, if this entry is accessed therefor, a protection verification exception will then be recognized. Action taken by the processor in response to a protection verification exception is discussed below.

If no exceptions are recognized during PVST lookup, then resulting entry fetched from PVST 175, here shown as entry 360, specifies, through the PVPT address, the real address of the beginning of a specific PVPT.

Once PVST entry 360 is obtained, this entry, along with the page index in virtual address 405, is used to access PVPT 185 to obtain the token corresponding to the virtual page address. In particular, PVST entry 360 obtained from PVST 175 is routed, as symbolized by line 375, to one input of ADD process 380. The page index (PX) is routed, as symbolized by line 430 to another input of ADD process 380. The ADD process appends nine zero-valued bits to the right of PVST entry 360 and appends one rightmost and twenty-two leftmost zero-valued bits to the page index value, i.e., the value of the page index is multiplied by two. The resultant values are then added. Consequently, this process generates a thirty-one bit real address to PVPT 185 through ADD process 380.

Each entry in PVPT 185 is a specific and unique token having a specific format shown in Table 6 below:

TABLE 6

Protection Verification Page Table Entry

| TOKEN |
|---| bits: 0                15

The PVPT contains 512 PVPT entries. Each entry contains a two-byte token corresponding to each page frame that has its protection bit set. A two byte length permits 65,536 unique tokens per address space to be available to the operating system for assignment. Additionally, by having 512 PVPT entries corresponding to tokens for 512 page frames, then eight PVPTs can be stored into a single page frame of real memory space.

Subsequently, address translation and protection verification controller 450 compares retrieved token 390, via line 395, with token 440 supplied, along path 445, by the user program requesting access to the protected page frame. If the tokens match, the controller permits access to the page frame by producing real address 315 on path 460. Consequently, the program can alter the data at real address 315. However, if the tokens do not match or the program requesting to store to the page frame does not have a token, address translation and protection verification controller 450 produces a protection verification exception on path 455. As such, the operating system will terminate the program for making the unauthorized storage request. Additionally, if for any reason during the address translation and token verification process a protection verification exception is generated, the operating system will terminate the program which caused the exception.

Figure 3:
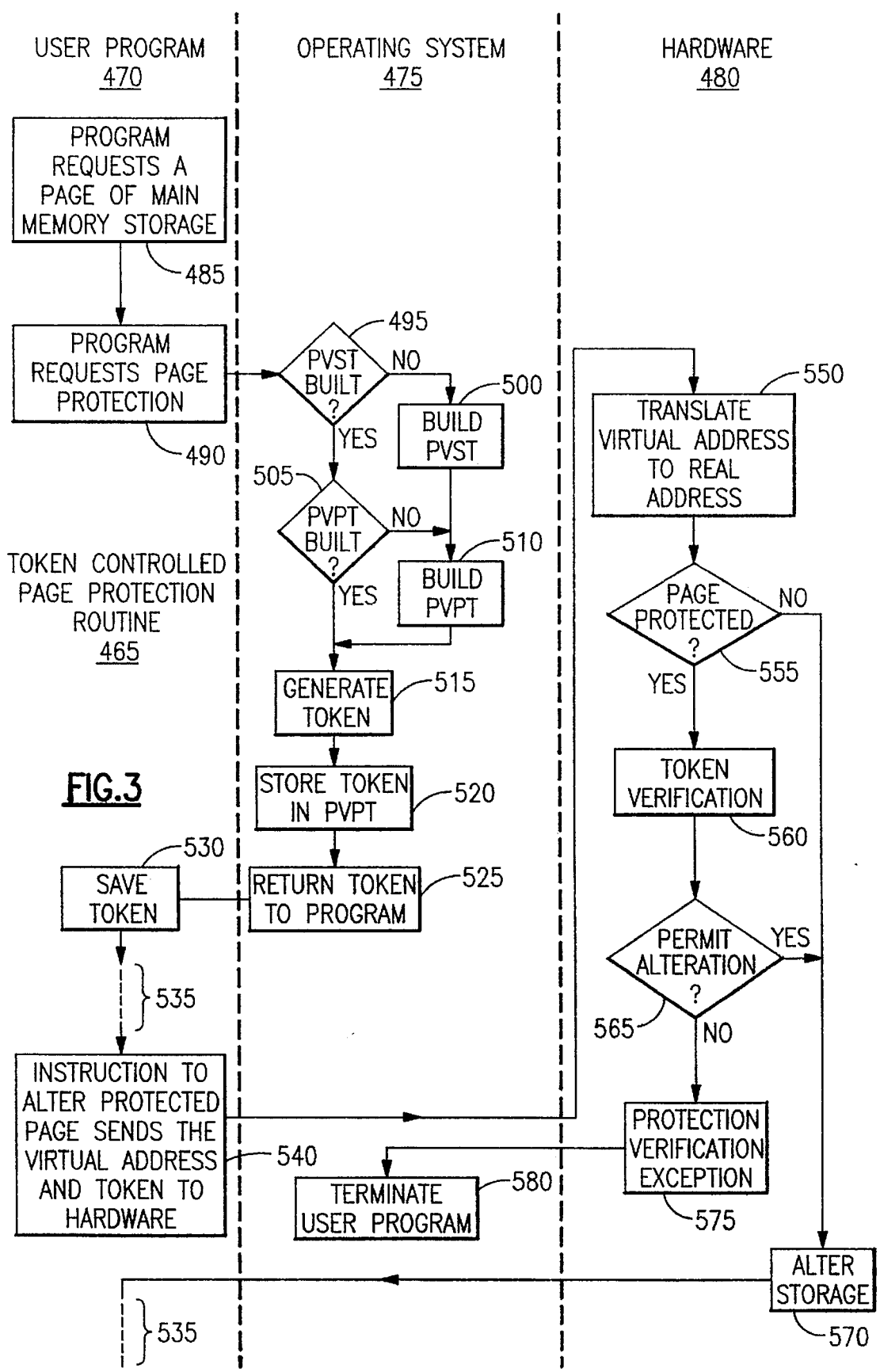
FIG. 3 a flow chart of our inventive token controlled page protection routine 465 as it would be executed in computer system 99 of FIG. 1.

FIG. 3 is a flow chart depicting the various process steps (collectively referred to as Token Controlled Page Protection Routine 465) which occur within user program 470, operating system 475, and hardware 480 (including the processor and memory access hardware) to facilitate our page protection technique (depicted as token controlled page protection routine 465). To simplify FIG. 3, routine 465 does not depict the process for building the address translation segment and page tables. Such a process is old in the art; therefore, those skilled in the art will readily be able to implement such a process.

Beginning at step 485, routine 465 depicts the user program requesting a page of storage. Additionally, at step 490, user program 470 requests page protection for that page of storage. In response to the request, operating system 475 queries, at step 495, whether a PVST is built. If not, the operating system builds the PVST at step 500. If the PVST is not built, neither is the PVPT. Therefore, once the PVST is built through step 500, the operating system builds, at step 510, the PVPT. Alternatively, if the PVST is found, at step 495, to exist, the routine queries, at step 505, whether the PVPT exists. If the PVST does not exist, the operating system builds the PVPT at step 510. However, if the PVPT exists, the routine proceeds to step 515.

At step 515, the operating system generates a unique 2-byte token for the present request by this user program. The operating system stores, at step 520, the token as an entry in the PVPT. And at step 525, the operating system returns the token to program 470.

At step 530, the user program stores the token in a register location and then proceeds with a normal program execution (symbolized by dashed line 535). Subsequently, when the user program issues an instruction to modify the information currently stored in the previously protected page, the processor must utilize the PVST and PVPT. To facilitate modifying the protected page, the user program issues a special instruction, at step 540. The special instruction to update a protected page retrieves the token from the register and provides that token to hardware 480. Along with the token, the user program supplies a virtual address which will be operated upon by the instruction. The microcode within the hardware performs address translation and protection verification. At step 550, the hardware translates the virtual page address to a real page address (page frame) in the manner previously described herein. At step 555, the routine queries whether that page frame is protected, i.e., is the protection bit set. If no protection is evident, the hardware permits, at step 570, the storage location to be updated. However, if the protection bit is set, the routine proceeds to step 560. At step 560, the token provided by the user program is compared to a token assigned to the protected page frame. As previously discussed, the token assigned to the protected page frame is found by using the PVST and the PVPT. If, at step 565, the tokens are determined to match, the hardware permits, at step 570, the user program to access and update the memory location indicated by the virtual address. Afterward, process control is returned to the program to continue user program execution symbolized by dashed line 535. However, if the tokens do not match, the hardware issues, at step 575, a protection verification exception. In response to the protection verification exception, the operating system terminates, at step 580, user program 470.

As a result of the foregoing token controlled page protection technique, our invention provides a memory space protection technique which allows a program that has previously requested page protection to both read and write information to its protected page without opening the page to inadvertent overlay. Our memory protection technique is fully compatible with present virtual memory storage systems and their present protection techniques.

The address translation and protection verification process described above assumes that such a process is utilized for each and every access to memory. In practice, such utilization tends to be relatively slow and adds significant overhead to memory access and instruction execution times. Hence, if the full address translation and protection verification process were to be performed for every virtual address, then these times would be slowed considerably which, in turn, would substantially decrease the throughput of the computer. Therefore, in an attempt to substantially eliminate the need to perform the entire address translation and protection verification process for every virtual address, a translation lookaside buffer (TLB) can be used. TLBs are widely used and well known in the art of address translation processes. Generally, these buffers, in hardware, store recently used virtual page addressed along with their corresponding page frame addresses. Once a virtual page address has been fully translated, this virtual address along with its corresponding physical page frame address are stored in a common entry in the TLB for subsequent use. Those skilled in the art will realize that such a TLB entry can be expanded to also include a token corresponding to the translated virtual address.

Consequently, when such a TLB is in use, then prior to performing a full address translation, the address translation process determines whether an incoming virtual page address resides within the TLB. If so, the corresponding page frame address and associated token (if the page is protected) is accessed therefrom and then used to form a real memory address which, in turn, is used to access main memory. If not, full address translation and protection verification occurs, and a new entry in the TLB is created for the latest virtual page address, its corresponding page frame address and a token. Hence, only those virtual addresses that have virtual page addresses which are not stored in the TLB are fully translated. Advantageously, this, in turn, drastically reduces the number of full address translations and protection verifications that must occur during program execution.

Figure 4:
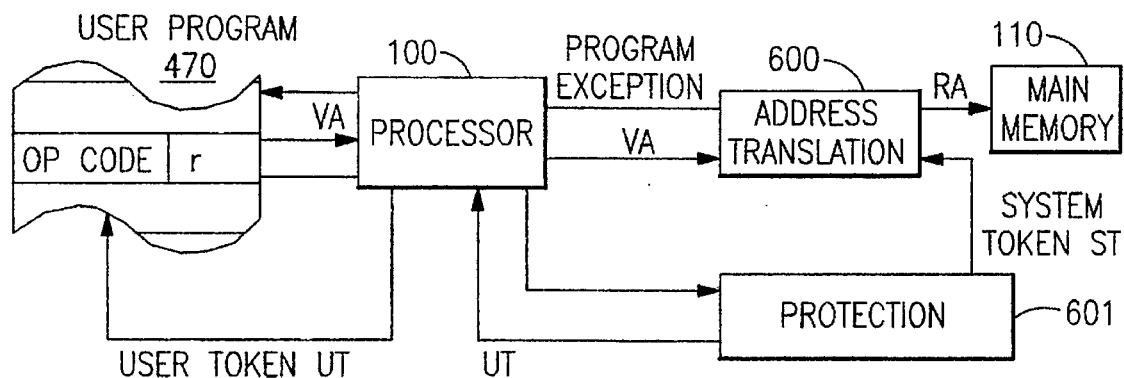
FIG. 4 depicts a high level block diagram illustrating the functional components of a token controlled protection system in accordance with the present invention.

FIG. 4 diagrammatically shows user program 470 with an instruction having an OP CODE and parameters (r) being executed by processor 100. As a first example, the OP CODE may simply represent a write instruction requesting that data be written into a previously created unprotected storage area having virtual address VA. In this case, parameters (r) contain virtual address VA. Upon execution of the write instruction, address translation apparatus 600 translates virtual address VA into a real address RA, determines that the page is unprotected and permits alteration of the data in main memory 110 at real address RA. As a second example, if the OP CODE in user program 470 is a request for page protection of a storage area specified by virtual address VA, which is one of the parameters (r), protection apparatus 601 responds by transmitting protection data to address translation apparatus 600 to establish a protected view of the storage area.

In accordance with the previous discussion, a page protection request may simply be a conventional request that data in the protected area be protected from alteration. As such, the protected view established by protection apparatus 601 would be activated only in response to operations that would alter data in the protected area. Of course, it is understood that the present invention conceives that a protection request may include conventional requests that the data be protected from other operations such as e.g. fetch, read, or execute.

For the embodiment shown in FIGS. 1–3, setting protection bits (P) 300 to a page protected state, e.g. a binary 1, establishes page protected views with respect to data alterations only. Consequently, a conventional (non-token) request to read the data at virtual address 405 will cause ATST 150, ATPT 160 and control 450 to activate an unprotected view of the storage area so that the data may be read. However, a conventional (non-token) request to write data to address 405 will cause ATST 150, ATPT 160 and control 450 to activate a protected view of the storage area by generating a protection verification exception on path 455.

A token controlled protection request by user program 470 (shown in FIG. 4), establishes an alternate view of the protected area. This alternate view, when activated, will permit user program 470 to access the protected area to alter the data therein. In response to the token controlled protection request, protection apparatus 601 transmits token controlled protection data to address translation apparatus 600 to establish the protected and access views for the area. Additionally, protection apparatus 601 passes user token UT to user program 407 as a corresponding system token ST is passed to translation apparatus 600 for use in activating the access view when it is necessary to alter the contents of the protected area.

In the embodiment of FIGS. 1–3 (with parenthetical references made to the steps shown in FIG. 5), operating system 475 establishes the protected view by setting protection bit (P) 300 in ATPT 160 to a one, as described above. Operating system 475 also establishes the access view by storing system token 385 (step 520) in PVPT 185 and sending the matching user token 440 (step 525) to user program 470. During execution of a token related instruction, user program 470 provides virtual address 405 and user token 440 to activate the access view of the protected area via tables 150, 160, 175 and 185 and control 450. Activating the access view causes virtual address 405 to be translated into real address 315, via tables 150 and 160, and into system token 385, via tables 175 and 185. Control 450 provides access to the protected area by outputting real address 315 on path 460 after successfully comparing user token 440 with system token 385.

The embodiment of FIGS. 1–3 accomplishes token controlled protection with protection verification tables 175 and 185, which collectively translate a virtual address into a corresponding system token. These tables along with their peripheral elements and control 450 are preferably implemented using hardware logic devices such as those used to implement the conventional address translation logic devices that include tables 150 and 160. Therefore, implementing token controlled protection in existing computer systems in accordance with the embodiment in FIGS. 1–3 typically involves retrofitting existing computer systems with new hardware units. To avoid the retrofitting expenses, which can be significant, users of existing systems may employ the software implementation of our present invention, which is illustrated in FIGS. 5–9.

Figure 5:
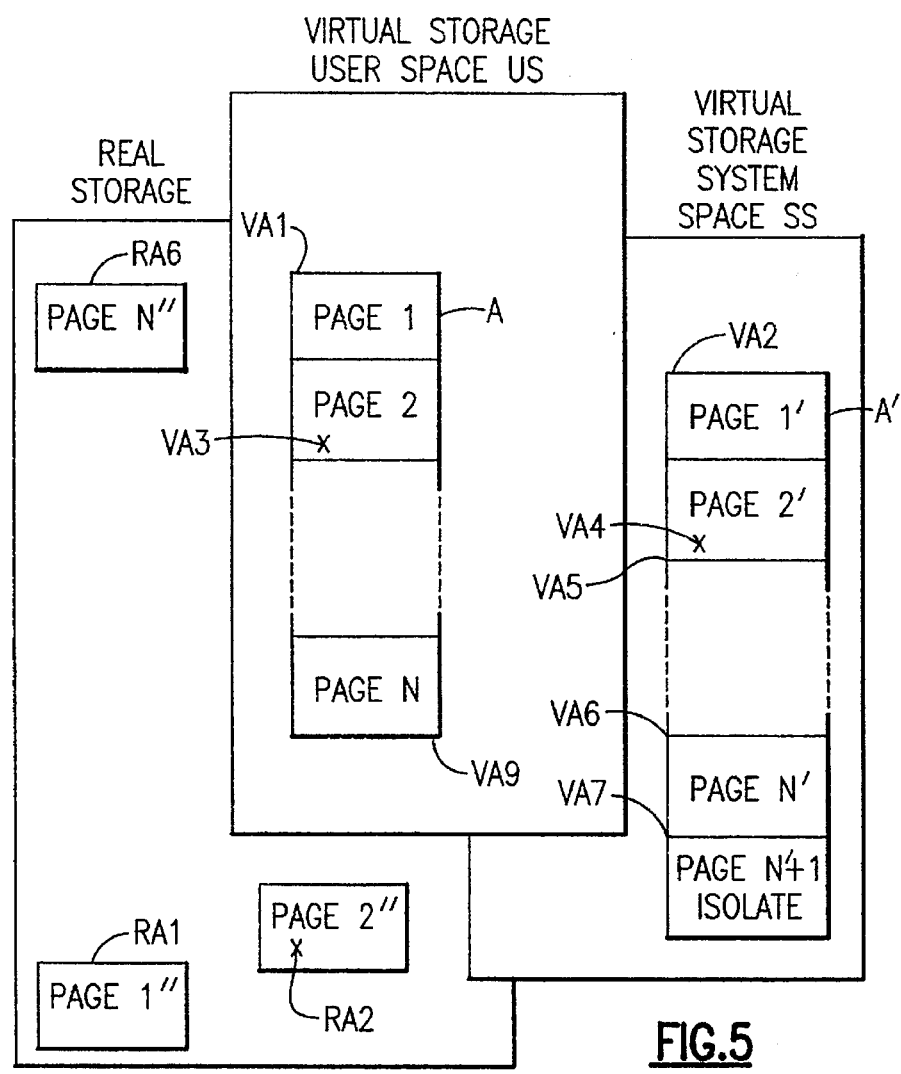
FIG. 5 diagramatically illustrates pages of data located in virtual and real storage in accordance with the embodiment illustrated in FIGS. 6–9.
Figure 6:
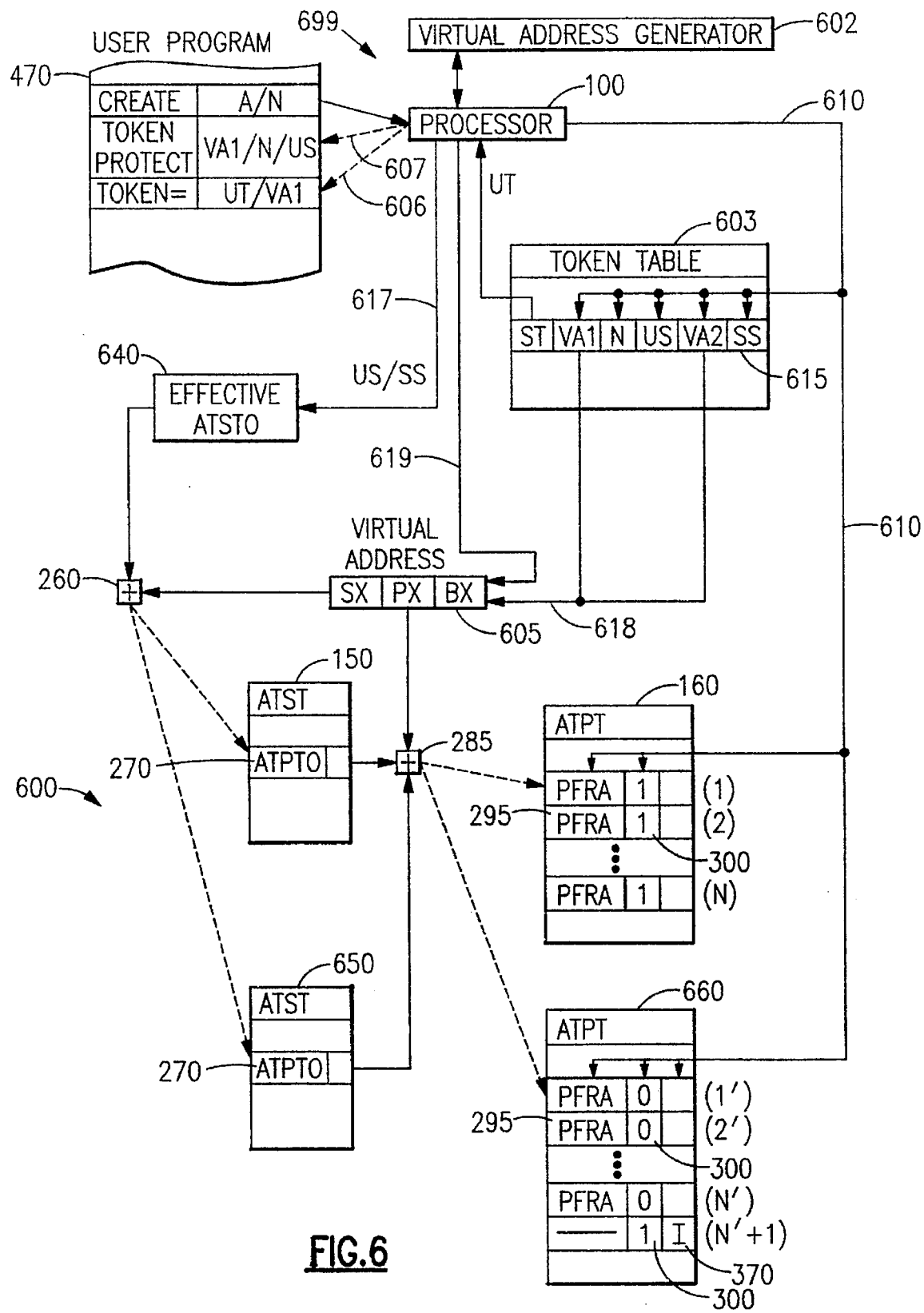
FIG. 6 depicts a block diagram illustrating an alternate embodiment of our invention in the state of obtaining token controlled protection for an area of storage.

FIG. 6 shows processor 100 of virtual storage computer system 699 executing user program 470 to obtain token protection for an area of storage. System 699 includes virtual address generator 602, token table 603, effective ATSTO register 640 and virtual address register 605. System 699 also includes conventional address translation apparatus 600 having address translation segment table 150 pointing at address translation page table 160, and address translation segment table 650 pointing at address translation page table 660. Tables 150 and 160 translate the virtual addresses in user space US into corresponding real addresses of real storage. Tables 650 and 660 translate the virtual addresses in system space SS into real addresses of real storage areas. The virtual storage of spaces SS and US, and the real storage of corresponding page frames are collectively graphically illustrated in FIG. 5.

Figure 7:
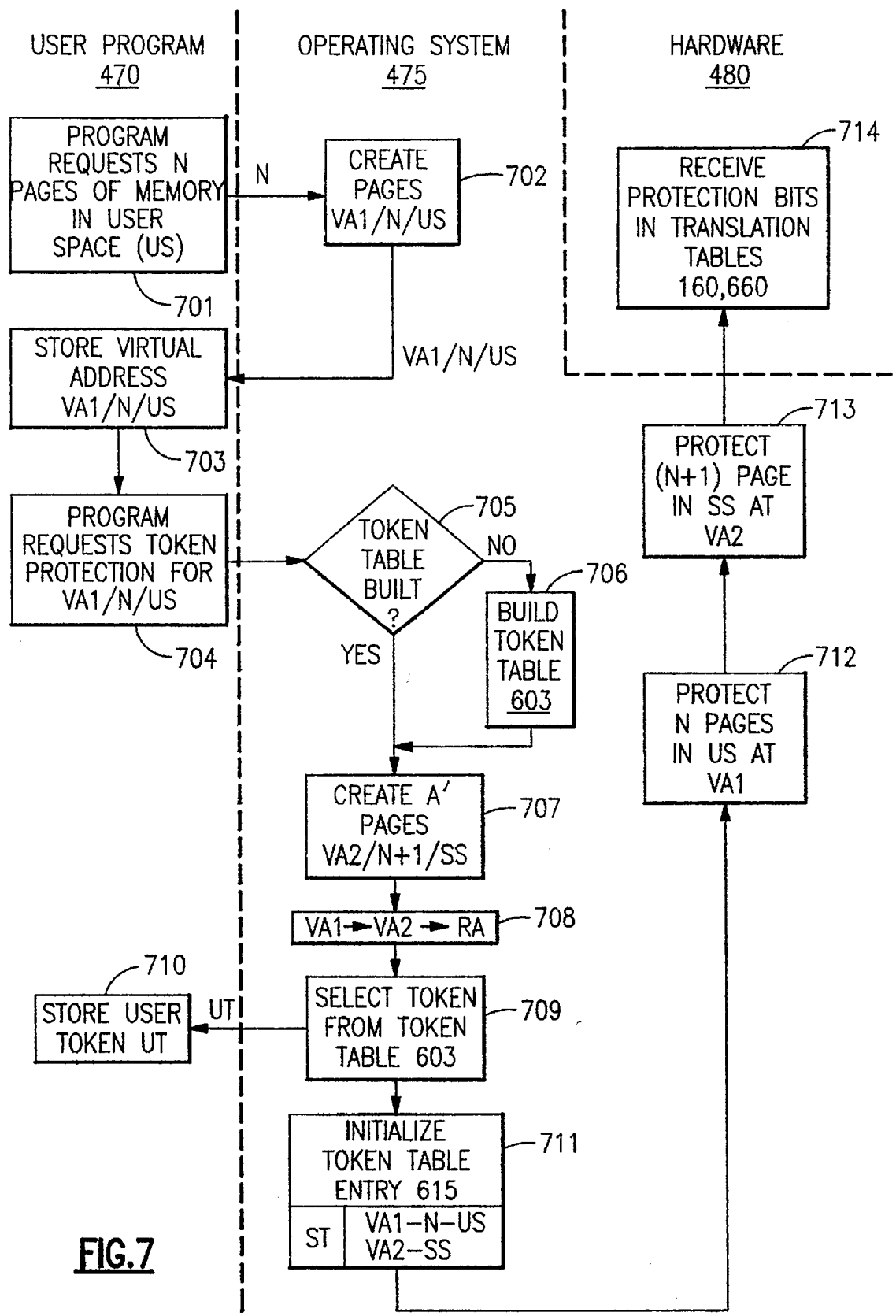
FIG. 7 is a flow chart showing a sequence of process steps performed by the embodiment of FIG. 6.

Specifically, FIG. 6 illustrates virtual storage computer system 699 executing user program 470 to provide a token protected virtual storage area A having N pages of data. The process steps involved in obtaining this token protection are illustrated in FIG. 7. For ease of understanding, the reader should simultaneously refer to FIGS. 6 and 7 throughout the following discussion. The CREATE A/N instruction of program 470 (see FIG. 6) requests that N pages of virtual storage be created in user space US of FIG. 5. FIG. 7 depicts this step via REQUEST step 701. Processor 100 responds by activating virtual address generator 602 of operating system 475. Generator 602, via CREATE PAGES VA1/N/US step 702, creates a virtual storage area A of N contiguous virtual pages having virtual address VA1 in user space US. FIG. 5 illustrates the N contiguous virtual pages as PAGE 1, PAGE 2, ... PAGE N in user space US. Processor 100 next returns the page location (VA1/N/US) over path 607 to user program 470, which stores the page location (VA1/N/US) via STORE step 703.

User program 470 next requests, via TOKEN PROTECT VA1/N/US instruction of FIG. 6 and REQUEST step 704 of FIG. 7, that token protection be provided for virtual storage area A. Operating system 475 responds by accessing or building, if necessary, token table 603 in steps 705 and 706. Additionally, virtual address generator 602 constructs, via CREATE step 707, an alternate virtual storage area A' having N+1 contiguous pages at virtual address VA2 in system space SS. FIG. 5 illustrates the N+1 contiguous virtual pages of alternate area A' as PAGE 1', PAGE 2', ... PAGE N' and isolate PAGE N'+1 in system space SS.

Operating system 475 also relates the data of virtual storage area A to that of virtual storage area A' and real storage via step 708. In that regard, processor 100 performs process step 708 by inputting, via path 610, appropriate page frame addresses (PFRAs) 295 into ATPTs 160 and 660. Specifically, processor 100 loads the same PFRA 295 in entry (1) in ATPT 160 and entry (1') in ATPT 660. ATPT entries (2) and (2') are also loaded with a common PFRA 295. Finally, processor 100 loads entries (N) and (N') with a common PFRA 295. Consequently, corresponding ATPT entries related to user space US and system space SS will translate to the same pages in real storage.

For example, with reference to FIG. 5, PAGE 1 of user space US and PAGE 1' of system space SS both correspond to PAGE 1" of real storage. Likewise, PAGE 2 of user space US and PAGE 2' of system space SS both correspond to PAGE 2" of real storage, and so on. It is noted that isolate PAGE N'+1 in system space SS has no equivalent page in user space US or real storage. To illustrate this condition in FIG. 6, PFRA 295 in entry N'+1 of ATPT 660 consists of a dashed line and validity field 370 has an I to indicate that PFRA 295 for that entry is invalid. The purpose of isolate PAGE N'+1 will become evident below.

Operating system 475 next selects, via SELECT TOKEN step 709, an available system token ST from token table 603. Operating system 475 makes a copy of the selected system token ST and passes that copy to user program 470 (as symbolized by dashed path 606 in FIG. 6) as a user token UT for storage in STORE USER TOKEN UT step 710. FIG. 6 illustratively shows processor 100 selecting the available system token ST from token table entry 615. Operating system 475 then initializes, via INITIALIZE step 711, the data fields in token table entry 615 over path 610. Specifically, processor 100 loads the following data into token table entry 615: VA1 (the user space virtual address of area A), N (the number of pages in area A), US (the user's virtual space in which area A is located), VA2 (the system space virtual address of area A') and SS (the system's virtual space in which area A' is located).

Finally, operating system 475 transmits, via PROTECT steps 712 and 713, protection bits (P) 300 to the entries of ATPTs 160 and 660. As can be seen in FIG. 6, each of the entries (1)–(N) of ATPT 160 has its protection bit (P) 300 set to 1 to indicate that each corresponding page is protected. Further, the protection bits (P) 300 for each of the entries (1')–(N') of ATPT 660 are set to 0, indicating that each corresponding page is not protected. Entry (N'+1) of ATPT 660 is set to 1, indicating that its corresponding isolate page is protected. Processor 100 sets protection bits (P) 300 in successive steps as the outputs of ATSTO 640 and virtual address register 605 selects the corresponding entries in ATPTs 160 and 660. Specifically, token table 603 loads virtual address register 605 with virtual addresses VA1 and VA2 over path 618. Addresses VA1 and VA2 correspond to the respective first page of each area A and A'. Over path 617, processor 100 loads ATSTO register 640 with data identifying user space US and system space SS. Over path 619, processor 100 increments page index PX of virtual address register 605 through the N and N+1 pages of areas A and A', respectively As ADD process 285 points in N successive steps to entries (1)–(N) of ATPT 160 and then in N+1 successive steps to entries (1')–(N'+1) of ATPT 660, processor 100 sets the corresponding protection bits (P) 300 to the values shown in FIG. 6.

As described below in detail, the setting of protection bits (P) 300 to a 1 in ATPT 160 establishes a protected view of the data in the N pages in real storage. Likewise, the setting of protection bits (P) 300 to a zero in ATPT 660 establishes an access view of the protected data in the N pages of real storage. The setting of protection bit (P) 300 to a one for the isolate page entry (N'+1) in ATPT 660 acts to isolate the unprotected pages from other unprotected pages by at least one protected page. This prevents programs that obtain a valid update pointer from altering data beyond the range, i.e., the end of the Nth (last) page (e.g., via a move character long (MVCL) instruction).

Figure 8:
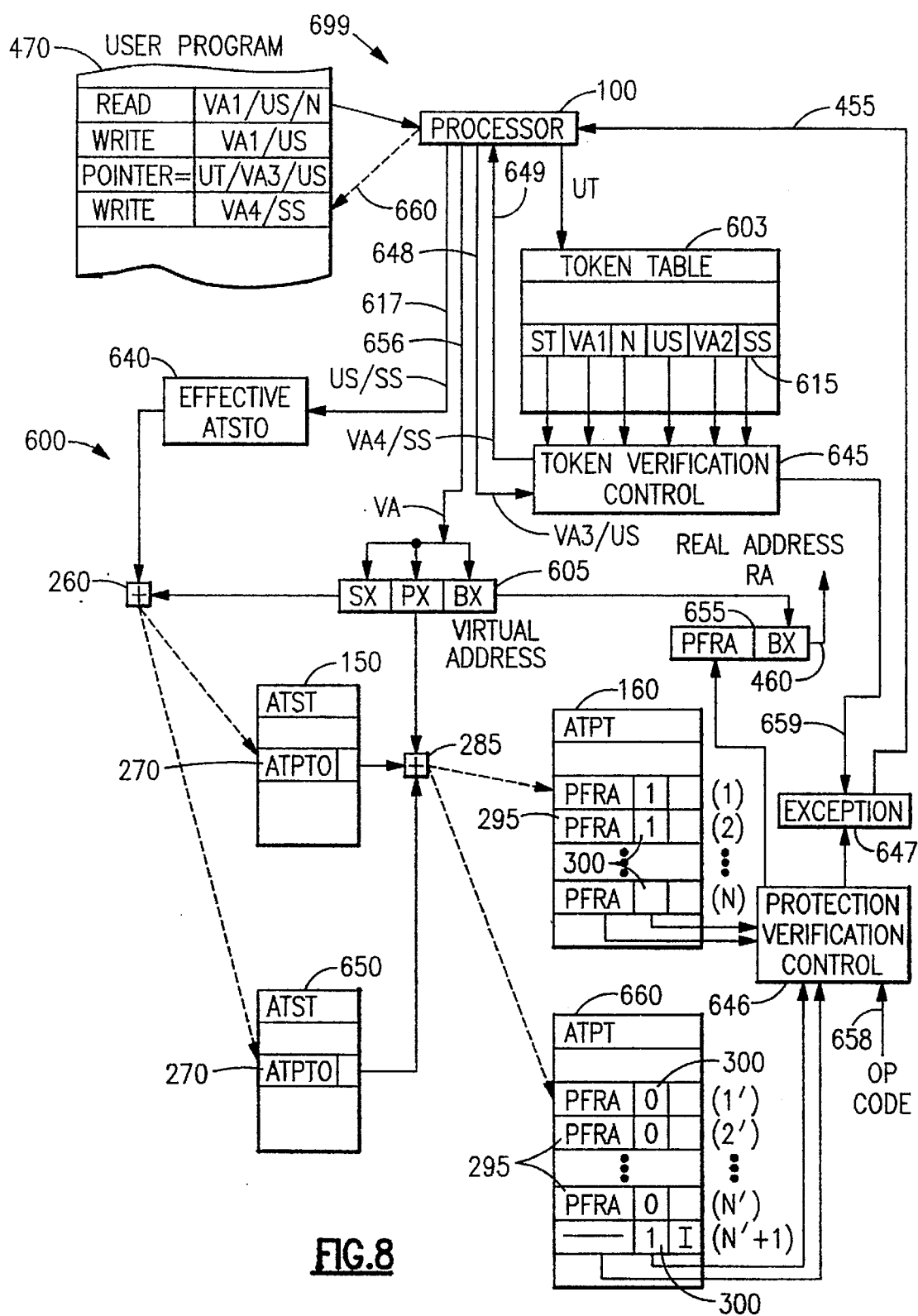
FIG. 8 depicts a block diagram illustrating the embodiment of FIG. 6 executing instructions including an instruction for obtaining access to a protected area of storage.

FIG. 8 illustrates processor 100 of virtual storage computer system 699 executing a series of read and write instructions in user program 470. In addition to the elements described with respect to FIG. 6, system 699 also includes token verification control 645, protection verification control 646, exception generator 647 and real address output register 655 as previously depicted in FIG. 8. Token verification control 645 receives inputs from the data fields of entry 615 in token table 603. Over path 648, processor 100 provides a protected virtual address input to token verification control 645 which, in turn, provides an accessible virtual address input to processor 100 over path 649. Protection verification control 646 receives inputs of page frame addresses 295 and page protection bits (P) 300 of ATPTs 160 and 660 respectively. An OP CODE input provides instruction information over path 658 to protection verification control 646, which, in turn, provides a PFRA input to register 655. Processor 100 provides virtual addresses VA over path 656 to virtual address register 605 which, in turn, communicates segment index SX to ADD process 260, page index PX to ADD process 285 and byte index BX to real address register 655.

To execute a conventional read operation of N pages of a protected area, such as the protected area having virtual address VA1 in user space US, processor 100 executes READ VA1/US/N instruction of user program 470. Processor 100 obtains access to the corresponding real address RA by loading virtual address VA1 in register 605 and user space US in register 640. ADD process 260 responds by pointing to segment table entry 270 in segment table ATST 150 related to user space US. The ATPTO of entry 270 in table 150 and page index PX of register 605 cause ADD process 285 to point at an entry of ATPT 160. PFRA 295 and protection bit (1) 300 in this entry are sent to control 646. The OP CODE input sends the READ instruction over path 658 to control 646 which, in turn, determines if the READ instruction is protected by protection bit (1) 300. Since the area is protected only with respect to operations that alter data, control 646 permits operating system 475 to execute the READ instruction. Control 646 loads PFRA 295 in register 655 which, in turn, outputs real address RA1 on path 460. The process is repeated for each of the N pages of virtual storage as processor 100 loads N successive virtual addresses VA for the N contiguous virtual pages. Since the page protection bits (P) 300 for each of the entries (1)–(N) is a one, control 646 permits the data in each page to be read by loading the appropriate PFRA 295 in register 655.

The second instruction in user program 470 of FIG. 8 illustrates a conventional write instruction to virtual address VA1. When processor 100 executes WRITE VA1/US instruction, the processor loads virtual address VA1 into register 605 and user space US in ATSTO register 640. In response, ADD process 260 points to segment table entry 270 in segment table ATST 150 for user space US. The ATPTO data of entry 270 in table 150 and page index PX of register 605 cause ADD process 285 to point to an associated entry of ATPT 160. ATPT 160 outputs PFRA 295 and protection bit (1) 300 in this particular entry to control 646. The OP CODE input sends the WRITE instruction over path 658 to control 646, which, in turn, determines that the page is protected with respect to the requested WRITE instruction. Since the area is protected with respect to operations that alter data, control 646 disallows the WRITE instruction by activating exception generator 647 to send a program exception to processor 100 over path 455.

Figure 9:
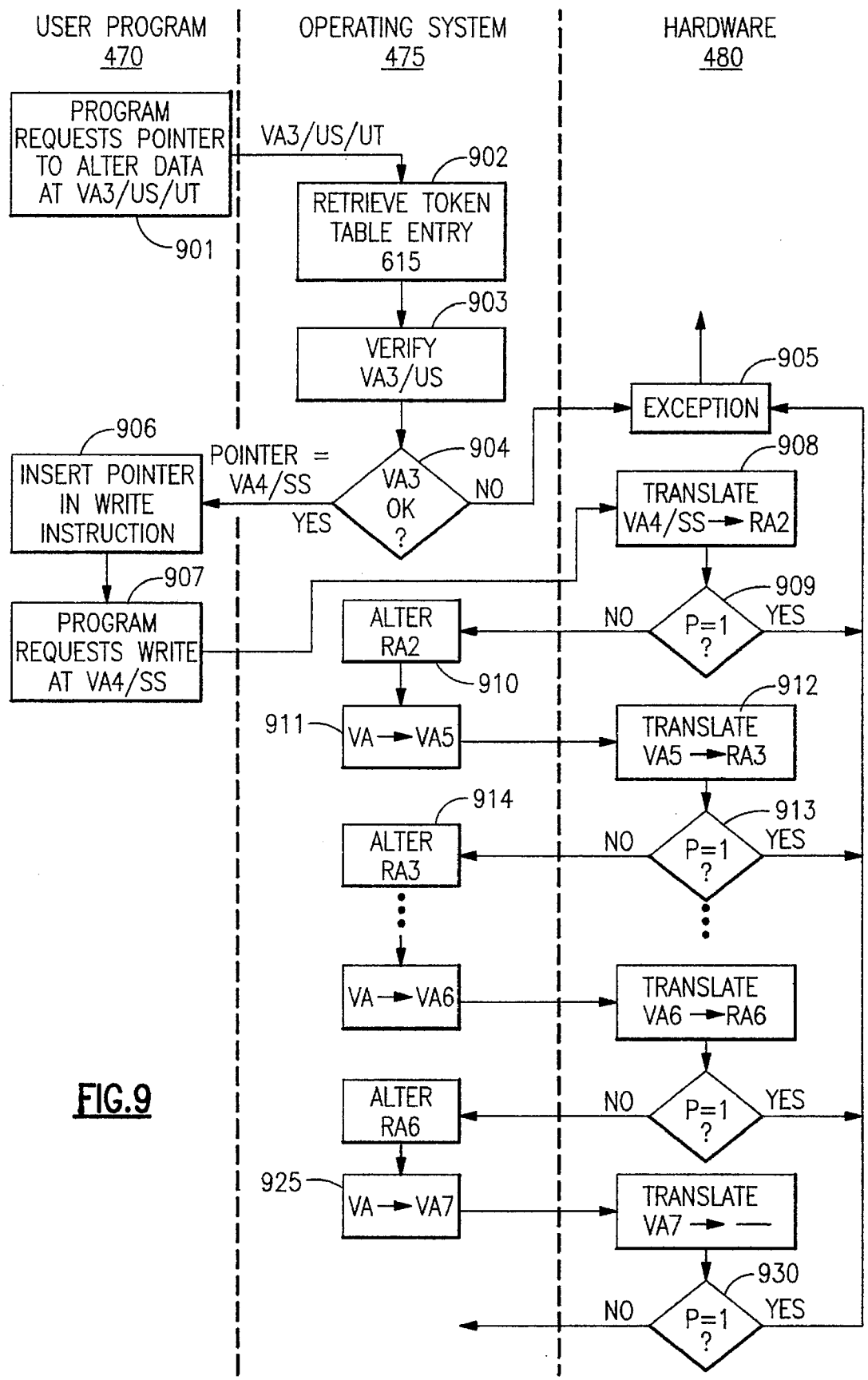
FIG. 9 is a flow chart showing a sequence of process steps performed by the embodiment of FIG. 8.

As explained above, to write data to a protected area, system 699 must obtain an access view of the protected area. Now, simultaneously referring to FIGS. 5, 8 and 9 (with FIG. 9 showing a sequence of steps performed by our inventive embodiment depicted in FIG. 8), assume that user program 470 desires to write data to a virtual storage location in user space US using a user's virtual address VA3, i.e. a point located in PAGE 2 of protected area A as seen in FIG. 5. Before executing the WRITE instruction, user program first uses the previously obtained user token UT associated with the protected area A to obtain a pointer. Specifically, POINTER=UT/VA3/US instruction requests, via step 901, that a pointer to the access view be returned to program 470. In RETRIEVE step 902, operating system 475 enters token table 603 and scans system tokens ST to find a match for user token UT, thereby locating the proper table entry 615. Token verification control 645 receives the data contained in table entry 615 along with user virtual address VA3 via path 648. As seen in FIG. 5, user virtual address VA3 is assumed to correspond to an internal point X in PAGE 2 of area A.

In VERIFY step 903, token verification control 645 of operating system 475 first verifies that point X resides somewhere in the N virtual pages of area A and determines a value of virtual address V4 corresponding to user virtual address VA3. Using the page size, the number N of protected pages and the value in table entry 615 for virtual address VA1, token verification control 645 determines virtual address VA9 for the point located at the end of area A (see FIG. 5). Control 645 then verifies that user virtual address VA3, supplied by program 470, lies within area A, i.e., address VA3 is greater than address VA1, taken from table entry 615, and less than address VA9, calculated by control 645. If user address VA3 lies outside area A, control 645, via decision step 904 and EXCEPTION step 905, sends an exception signal over path 659 to exception generator 647.

If control 645 verifies that user address VA3 lies in area A, control 645 calculates its corresponding pointer address VA4 in system space SS and passes it to user program 470 (see path 660 in FIG. 8) for insertion, via INSERT POINTER step 906, in the WRITE instruction as a pointer to the access view. Control 645 calculates pointer address VA4 by calculating the distance between addresses VA1 and VA3, and then adding that distance to the value of address VA2 as taken from table entry 615.

Next through WRITE VA4/SS step 907, user program 470 requests that the access view be activated so that data can be written to the real storage starting at real address RA2 of PAGE 2" which corresponds to pointer virtual address VA4, in system space SS, and user virtual address VA3, in user space US. Address translation apparatus 600 responds to this write request by accessing pages in real storage one page at a time. Address translation apparatus 600 first performs TRANSLATE VA4/SS-to-RA2 step 908. Specifically, processor 100 first loads pointer address VA4 in register 605, over path 656, and system space SS in ATSTO register 640, over path 617. This causes ADD process 260 to point to table entry 270 of ATST 650, in turn, causing ADD process 285 to point to entry (2') in ATPT 660. Protection verification control 646 then reads PFRA 295, page protection bit (P) 300 and the OP CODE for the write instruction. In P=1? step 909, protection verification control 646 verifies that the page is unprotected. If P equals one, EXCEPTION step 905 performs a program exception. If P equals zero, operating system 475 writes to PAGE 2" starting at address RA2 (see ALTER step 910). Next, in INCREMENT step 911, processor 100 increments the virtual address in register 605 to VA5, the top of the next page. TRANSLATE step 912 translates address VA5 into real address RA3. P=1? step 913 checks for page protection; ALTER step 914 writes data to real address RA3, and so forth.

This process of accessing pages of real storage one page at a time continues until either all of the data has been written to storage or isolate PAGE N'+1 has been reached in ATPT 660, whichever occurs first. In other words, when the accessible storage is greater than the total data to be written, operating system 475 simply writes each page of data and then executes the next instruction in user program 470. However, when the accessible storage is less than the total data to be written, the isolate page entry (N'+1) in ATST 660 will eventually be encountered causing a program exception to be generated.

More specifically, after operating system 475 increments (see INCREMENT step 925) the virtual address in register 605 to address VA7, i.e. the address of isolate PAGE N'+1, ADD process 285 points to entry (N'+1) in ATPT 660 of FIG. 8. In P=1? step 930, protection verification control 646 will find page protection bit (P) 300 set to a 1, indicating that the data is write protected. Since the OP CODE is a write instruction, protection verification control 646 sends an exception signal to exception generator 647 and EXCEPTION step 905 is performed.

Those skilled in the ESA/390 will readily appreciate that token protection in accordance with this embodiment of the present invention may be readily implemented with only slight modifications to the PGSER PROTECT service provided by the MVS/ESA operating system. Of course, those individuals will also appreciate that both embodiments of the invention may be applied simultaneously to the same computer system.

Additionally, unprotected storage area A' in system space SS may be placed in other spaces including user space US. However, to reduce the chances of having an accidental overlay of its unprotected pages, area A' is preferably located in a remote, seldom used space, such as system space SS. In the MVS/ESA implementation, area A, the protected area, could be address space virtual storage or a data space. The address could be qualified by an address space number or a space token for a data space. Address space storage can be either common or private storage of any key using key protection. When area A' resides in a common area data space (CADS), the returned address, e.g. pointer address VA4, may be qualified by the access list entry token (ALET) necessary to address the CADS. Also, instead of transmitting a special exception signal over path 659 when a matching system token ST cannot be found or user virtual addresses VA3 is found to lie outside area A, token verification control 645 could simply return, over path 648, virtual address VA7 of isolate PAGE N'+1 which, when translated, will result in an exception.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

We claim:

1. A virtual storage computer system having token controlled storage protection comprising:

a data processor;

a real storage means for providing a real storage area with a real address;

a virtual storage means for providing a first virtual storage area with a first virtual address;

a user program means for execution by said data processor, said user program means having a protection request means for requesting that said token controlled storage protection be provided for said real storage area via said first virtual address and that a corresponding user token be returned by said processor, a store means for storing said user token corresponding to said first virtual address, and access request means for requesting access to said real storage area and wherein said access request means includes a token-request means for requesting access to said real storage area via a token-accessible view of said real storage area;

an address translation means responsive to said access request means for translating a virtual address into a corresponding real address; and token protect means, responsive to said protection request means, for generating said user token and a corresponding system token, and area protection means for establishing a protected view and said token-accessible view via said address translation means.

2. The system of claim 1 wherein said token-access request means includes means for providing a user virtual address and said user token.

3. The system of claim 2 further including exception means for generating a program exception when said user program activates said protected view.

4. The system of claim 3 wherein said address translation means includes means for translating said user virtual address into a corresponding real address and outputting said corresponding real address when said user program activates said token-accessible view.

5. The system of claim 4 further including means for activating said token-accessible view in response to said access request means providing said user virtual address and said user token.

6. A virtual storage computer system having token controlled storage protection comprising:

a data processor;

a real storage means for providing a real storage area with a real address;

a virtual storage means for providing a first virtual storage area with a first virtual address;

a user program means for execution by said data processor, said user program means having a protection request means for requesting that said token controlled storage protection be provided for said real storage area via said first virtual address and that a corresponding user token be returned by said processor, a store means for storing said user token corresponding to said first virtual address, and access request means for requesting access to said real storage area and wherein said access request means includes a token-access request means for providing a user virtual address and said user token for requesting access to said real storage area via a token-accessible view of said real storage area;

an address translation means responsive to said access request means for translating a virtual address into a corresponding real address; and token protect means, responsive to said protection request means, for generating said user token and a corresponding system token, and area protection means for establishing a protected view and said token-accessible view via said address translation means.

7. The system of claim 6 wherein said address translation means includes means for translating said user virtual address into said system token.

8. The system of claim 7 wherein said address translation means includes a token verification control means for comparing said user token to said system token, for providing said real address when said user and system tokens correspond, and for providing a program exception when said user and system tokens do not correspond.

9. A virtual storage computer system having token controlled storage protection comprising:

a data processor;

a real storage means for providing a real storage area with a real address;

a virtual storage means for providing a first virtual storage area with a first virtual address and a second virtual storage area with a second virtual address, said second virtual storage area corresponding to said first virtual storage area and said real storage area;

a user program means for execution by said data processor, said user program means having a protection request means for requesting that said token controlled storage protection be provided for said real storage area via said first virtual address and said second virtual address, and that a corresponding user token be returned by said processor, a store means for storing said user token corresponding to said first virtual address, and access request means for requesting access to said real storage area;

an address translation means responsive to said access request means for translating a virtual address into a corresponding real address; and token protect means, responsive to said protection request means, for generating said user token and a corresponding system token, and area protection means for establishing a protected view and a token-accessible view of said real storage area via said address translation means.

10. The system of claim 9 wherein said area protection means establishes said protected view of said real storage area with respect to said first virtual address, and establishes said token-accessible view of said real storage area with respect to said second virtual address.

11. The system of claim 10 further including a token table means for storing said system token, said first virtual address and said second virtual address.

12. The system of claim 11 wherein said access request means includes a pointer request means for using said user token to locate a corresponding system token in said token table means and to retrieve a pointer virtual address corresponding to a user virtual address provided with said user token by said access request means.

13. The system of claim 12 wherein said token table means includes a token verification control means for generating said pointer virtual address and passing it to said access request means if said user virtual address is calculated to be in said first virtual storage area, and for requesting an exception if said user virtual address is not in said first virtual storage area.

14. The system of claim 13 wherein said access request means requests access to said real storage via said token-accessible view by providing said pointer virtual address.

15. The system of claim 14 further including an isolating storage area contiguous with said second virtual storage area, and wherein said token protect means establishes a protected view of said real storage area with respect to the virtual address of said isolating storage area.

16. A method of token controlled storage protection in a virtual storage computer system having a real storage and a virtual storage, said method comprising:

creating, in said real storage, a real storage area with a real address;

creating, in said virtual storage, a first virtual storage area with a first virtual address and corresponding to said real storage area;

establishing a protected view and a token-accessible view from a user program to said real storage area via an address translation means, including acquiring a user token and a system token corresponding to said first virtual storage area, and storing said user token in said user program;

requesting access to said real storage area by providing said user token and a user virtual address via said user program; and comparing said user token with said system token and, if said user and system tokens correspond, activating said token-accessible view and outputting said real address, and, if said user and system tokens do not correspond, activating said protected view and outputting a program exception.

17. The method of claim 16 wherein said activating said token-accessible view includes translating said user virtual address into said real address and said system token.

18. A method of token controlled storage protection in a virtual storage computer system having a real storage and a virtual storage, said method comprising:

creating, in said real storage, a real storage area with a real address;

creating, in said virtual storage, a first virtual storage area with a first virtual address and corresponding to said real storage area;

creating, in said virtual storage, a second virtual storage area with a second virtual address and corresponding to said real storage area and said first virtual storage area;

establishing a protected view and a token-accessible view from a user program to said real storage area via an address translation means, including acquiring user and system tokens corresponding to said first virtual storage area, and storing said user token in said user program; and requesting access to said real storage area by providing said user token via said user program.

19. The method of claim 18 wherein said establishing said token-accessible view includes providing a protected view of said real storage area with respect to said first virtual address and an unprotected view of said real storage area with respect to said second virtual address.

20. The method of claim 19 wherein said establishing said token-accessible view includes relating said first and second virtual addresses and said system token in a token table.

21. The method of claim 20 wherein said requesting access to said real storage area includes providing a user virtual address in said first virtual storage area along with said user token to obtain a pointer virtual address in said second virtual storage area.

22. The method of claim 21 further including generating, in response to said requesting access to said real storage, said pointer virtual address corresponding to said user virtual address if said user virtual address is within said first virtual storage area and returning said pointer virtual address to said user program, and generating a program exception if said user virtual address is outside said first virtual storage area.

23. The method of claim 22 further including activating said token-accessible view in response to said user program requesting access to said real storage with said pointer virtual address.

24. The method of claim 23 further including creating an isolating storage area contiguous with said second virtual storage area, and establishing a protected view of said real storage area with respect to the virtual address of said isolating storage area.

25. The method of claim 24 further including generating a program exception in response to activating said protected view of said real storage via said virtual address of said isolating storage area.

* * * * *